(12) United States Patent  
Sato et al.

(10) Patent No.: US 6,526,231 B2
(45) Date of Patent: Feb. 25, 2003

(54) TREMBLE CORRECTION CAMERA

(75) Inventors: Tatsuya Sato, Iruma (JP); Hisayuki Matsumoto, Hachioji (JP)

(73) Assignee: Olympus Optical Co., Ltd. (JP)

(*) Notice: Subject to any disclaimer, the term of this patent is extended or adjusted under 35 U.S.C. 154(b) by 0 days.

(21) Appl. No.: 09/829,567

(22) Filed: Apr. 10, 2001

(65) Prior Publication Data

US 2001/0043809 A1 Nov. 22, 2001

(30) Foreign Application Priority Data

Apr. 14, 2000 (JP) .................................... 2000-114201
Apr. 14, 2000 (JP) .................................... 2000-114202
Apr. 14, 2000 (JP) .................................... 2000-114203
May 30, 2000 (JP) .................................... 2000-160297

(51) Int. Cl.$^7$ ............................................. G03B 17/00
(52) U.S. Cl. ................................................... 396/55
(58) Field of Search .................................. 396/55, 529

(56) References Cited

U.S. PATENT DOCUMENTS 5,270,857 A    12/1993  Oizumi et al. .............. 359/554
5,655,157 A *  8/1997  Enomoto ....................... 396/55
5,794,081 A *  8/1998  Itoh et al. ..................... 396/55
6,183,145 B1 * 2/2001  Aihara et al. ................ 396/529

FOREIGN PATENT DOCUMENTS

| JP | 01-191113 | 8/1989 |
| JP | 08-129198 | 5/1996 |
| JP | 2605326   | 2/1997 |

* cited by examiner

Primary Examiner—W. B. Perkey
(74) Attorney, Agent, or Firm—Straub & Pokotylo; John C. Pokotylo

(57) ABSTRACT

A correction camera that makes it possible to confirm the result of correction through a viewfinder without an increase in the size of a taking lens or an increase in costs. According to one embodiment of the present invention, a camera in which a taking lens 2 is attachable/detachable to/from a camera body 1 includes an optical correction member 14 that is moved in order to correct a tremble by photographer. The optical correction member 14 is located near a mounting/dismounting member of the camera body 1 in or from which the taking lens 2 is mounted or dismounted.

18 Claims, 22 Drawing Sheets

TREMBLE CORRECTION CAMERA

This application claims benefit of Japanese Patent Applications Nos. 2000-114201 (filed in Japan on Apr. 14, 2000), 2000-114202 (filed in Japan on Apr. 14, 2000), 2000-114203 (filed in Japan on Apr. 14, 2000) and 2000-160297 (filed in Japan on May 30, 2000), the contents of which are incorporated by this reference.

BACKGROUND OF THE INVENTION

1. Field of the Invention

The present invention relates to a tremble correction camera, and more particularly, to a tremble correction camera having a function for correcting a tremble derived from a photographer's hand tremble.

2. Description of the Related Art

In recent years, various technologies have been proposed for a camera capable of preventing degradation of quality of a pickup image caused by a photographer's hand tremble.

For example, there is the technology of warning a photographer of a hand tremble in a low-shutter speed mode that is prone to a hand tremble, or the technology of changing a shutter speed to a high shutter speed according to a program line. Moreover, there is the technology of detecting a degree of a hand tremble using an acceleration sensor or an angular speed sensor and starting opening and closing a shutter at a timing at which the hand tremble is minimized during exposure. Methods for actively correcting a tremble in an image responsively to detection of a hand tremble include a method of tilting a lens included in a taking optical system or displacing it in a direction orthogonal to the optical axis of the optical system so as to cancel a tremble in an image to thus stabilize a pickup image on film.

Cameras in which the method of tilting or displacing a lens included in a taking optical system include, for example, a camera disclosed in Japanese Patent No. 2605326 (Japanese Laid-open patent publication No. 1-191113). In the disclosed camera, a hand tremble is corrected by driving the last group of lenses included in the taking optical system in a direction perpendicular to the optical axis of the optical system.

Moreover, Japanese Laid-open patent publication No. 8-129198 discloses a camera that drives film in a direction perpendicular to the optical axis of an optical system so as to correct a hand tremble.

The camera disclosed in the Japanese Patent No. 2605326 (Japanese Laid-open patent publication No. 1-191113) has a hand tremble correcting mechanism included in a taking lens. Therefore, when the camera has various interchangeable taking lenses selectively attached to a camera body according to a photographic situation, a hand tremble correcting mechanism is needed for each of the interchangeable taking lenses. Moreover, a tremble detection sensor and a tremble correcting mechanism must be included in each taking lens. This leads to an increase in the size of a taking lens and an increase in the costs of the camera.

Moreover, the camera disclosed in the Japanese Laid-open patent publication No. 8-129198 drives film to correct a hand tremble. Therefore, when it comes to a single-lens reflex camera, the result of correction recognized in a pickup image cannot be checked through a viewfinder.

OBJECT OF THE INVENTION

To solve the foregoing inconvenience, it is considered that a camera having a tremble correcting function that makes it possible to check the result of correction through a viewfinder without inviting an increase in the size of a taking lens or an increase in costs.

SUMMARY OF THE INVENTION

A tremble correction camera of the present invention includes: a camera body; a taking lens attachable/detachable to/from the camera body; and a tremble correction optical system located near a dismounting/mounting member of the camera body in which the taking lens is mounted.

A tremble correction camera of the present invention includes: a camera body; a light path changing unit for changing a path of light that represents a pickup image through a taking optical system; and a tremble correction optical system located in front of the light path changing unit within the camera body.

A tremble correction camera of the present invention includes: a camera body having a main mirror and a mount in or from which a taking lens can be mounted or dismounted; a tremble correction optical system interposed between the main mirror and the mount, composed of optical members, and moved in order to correct a tremble; a driver for driving the tremble correction optical system; a first control unit incorporated in the camera body and controlling photography; a second control unit incorporated in the camera body and controlling the driver; a first detector for detecting whether the taking lens is attached to the camera body; and a second detector for detecting whether a tremble correction mode in which the tremble correction optical system is used to correct a tremble is set.

A tremble correction camera of the present invention includes: a detector for detecting a tremble of the camera; a correction optical system interposed between a mount, in or from which a taking lens can be mounted or dismounted, and a main mirror, and moved in order to correct a tremble according to the tremble detected by the detector; a judging unit for judging whether a focal length exhibited by the taking lens falls within a predetermined range; and a corrective movement restricting unit for restricting the corrective movement of the tremble correction optical system according to the result of judgment made by the judging unit.

A tremble correction camera of the present invention includes: a detector for detecting a tremble of the camera; a correction optical system interposed between a mount, in or from which a taking lens can be mounted or dismounted, and a main mirror, and moved in order to correct a tremble according to the tremble detected by the detector; and a corrective movement restricting unit for restricting the corrective movement of the tremble correction optical system according to a focal length exhibited by the taking lens.

A tremble correction camera of the present invention includes: a camera body having a main mirror and a mount in or from which a taking lens can be mounted or dismounted; a tremble correction optical system interposed between the main mirror and the mount, composed of optical members, and moved in order to correct a tremble; a driver for driving the tremble correction optical system; a first controller including a first judging unit that judges whether a focal length exhibited by the taking lens falls within a predetermined range, and controlling photography; and a second controller including a second judging unit that judges whether a focal length exhibited by the taking lens falls within a predetermined range, and controlling tremble correction.

A tremble correction camera of the present invention includes: a detector for detecting a tremble of the camera; a tremble correction optical system interposed between a mount, in or from which a taking lens can be mounted or dismounted, and a main mirror, and moved in order to correct a tremble according to the tremble detected by the detector; a lens change switch to be used to dismount the taking lens from the mount; a detector for detecting whether the taking lens is mounted in the mount; and a movement control unit for controlling the movement of the tremble correction optical system according to a change in the state of either the lens mounting detector or the lens change switch.

A tremble correction camera of the present invention includes: a detector for detecting a tremble of the camera; a tremble correction optical system interposed between a mount, in or from which a taking lens can be mounted or dismounted, and a main mirror, and moved in order to correct a tremble according to the tremble detected by the detector; a driver for driving the main mirror; and a movement control unit for when the driver drives the main mirror, controlling the movement of the tremble correction optical system.

The above and other objects, features and advantages of the invention will become more apparent from the following description when taken in conjunction with the accompanying drawings.

DESCRIPTION OF THE PREFERRED EMBODIMENTS

Figure 1:
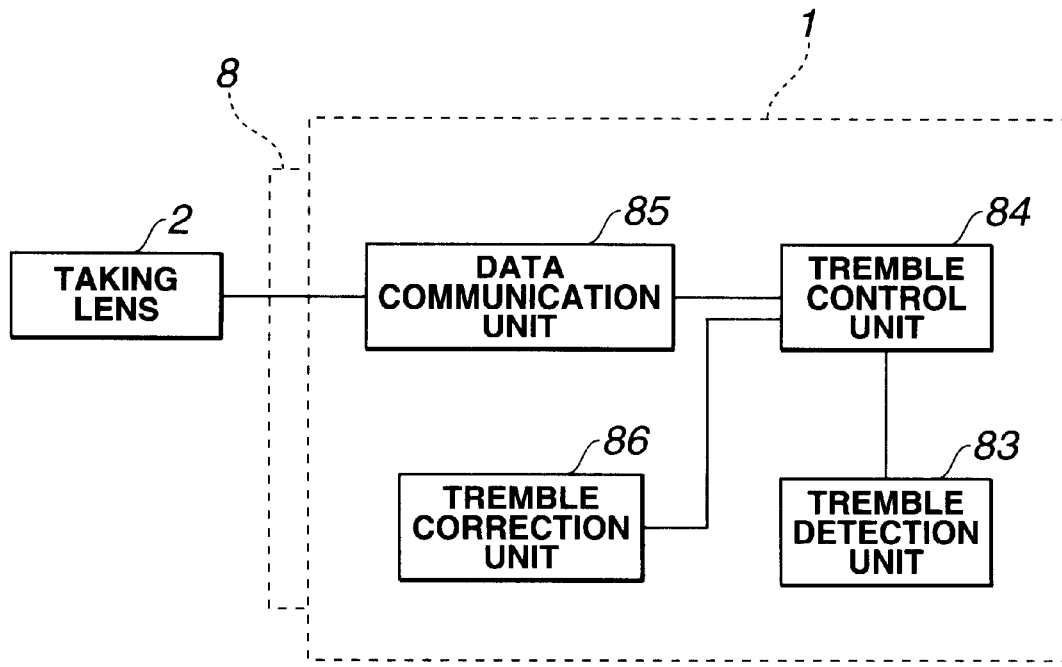
FIG. 1 is a block diagram showing the conceptual configuration of a camera in accordance with the present invention which is involved in tremble correction.

Referring to the drawings, an embodiment of the present invention will be described below.

FIG. 1 is a block diagram showing the conceptual configuration of a camera in accordance with an embodiment of the present invention that has a tremble correcting function. Correction of a hand tremble that causes a blur in an image will be described below.

A camera in accordance with the present invention is a single reflex camera, and has a lens mount, which is a taking lens mounting/dismounting member, formed on a camera body so that interchangeable taking lenses can be selectively attached to the camera. A quick return mirror that is a main mirror is incorporated in the camera body. The quick return mirror routes an object image, which is picked up by any of interchangeable taking lenses mounted on the lens mount, to a viewfinder through which the image is visually checked. For exposure, the quick return mirror routes the object image onto film. A tremble correction optical member is interposed between the lens mount and the quick return mirror. A tremble detection sensor incorporated in the camera body detects a hand tremble. The tremble correction optical member corrects a tremble in the object image incident on the film.

As shown in FIG. 1, a taking lens 2 that is one of interchangeable lenses can be detachably attached to a camera body 1. The camera body 1 includes a tremble detection unit 83 and a tremble control unit 84. The tremble detection unit 83 is a sensor for detecting a photographer's hand tremble. The tremble control unit 84 that is a microcomputer responsible for control of tremble correction calculates a magnitude of control according to the hand tremble detected by the tremble detection unit 83, and controls a tremble correction unit 86, which will be described later, so as to cancel the photographer's hand tremble. The camera body 1 further includes a data communication unit 85, the tremble correction unit 86, and a mount 8. The mount 8 is a member of the camera body 1 on which the taking lens 2 is mounted. The data communication unit 85 communicates with the taking lens 2, and provides the tremble control unit 84 with information necessary for control of tremble correction (for example, a focal length). The tremble correction unit 86 consists of a tremble correction optical system and a driving mechanism for driving the tremble correction optical system. The tremble correction unit 86 drives the tremble correction optical system under control of the tremble control unit 84 so as to cancel the photographer's hand tremble. The data communication unit 85 and tremble correction unit 86 are located near the mount 8.

Figure 2:
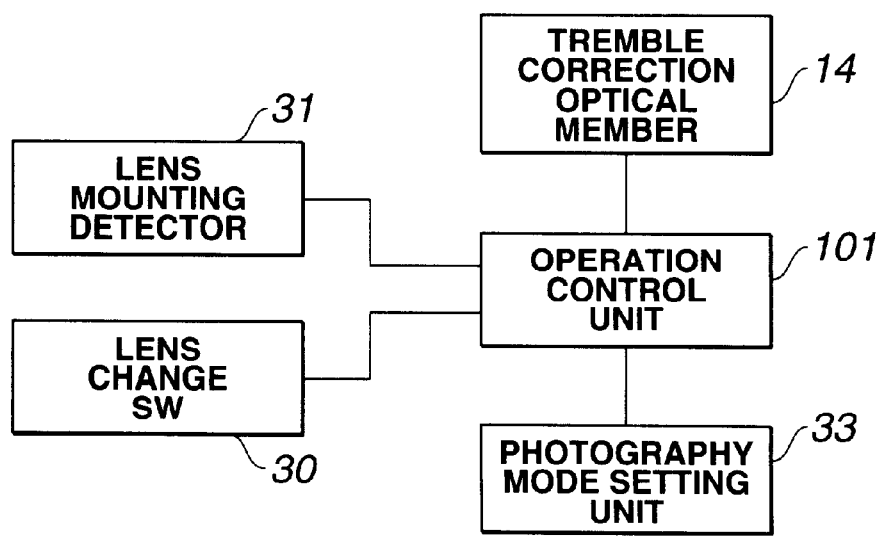
FIG. 2 is a block diagram showing the relationship between a tremble correction optical member and any of interchangeable taking lenses that are employed in the camera in accordance with the present invention.

FIG. 2 shows the relationship between the tremble correction optical member and any of interchangeable taking lenses.

To begin with, a description will be made of basic components required to maintain the relationship between the tremble correction optical member and any of interchangeable taking lenses.

A tremble correction optical member 14 is interposed between a lens mount on a camera body and a quick return mirror. The tremble correction optical member 14 is inclined and displaced in order to move an image on the image plane of an optical system (film). Thus, a tremble in the image derived from a vibration of the camera body caused by a photographer's hand tremble is canceled. The tremble correction optical member 14 is driven under control of an operation control unit 101 composed of a camera control microcomputer and a tremble control microcomputer that will be described later. The operation control unit 101 extends control to incline or displace the tremble correction optical member, drives the tremble correction optical member to an initial position, or locks the tremble correction optical member after a taking lens is dismounted from the mount.

A lens change switch 30 and a lens mounting detector 31 are connected to the operation control unit 101. The lens change switch 30 is pressed in order to dismount a taking lens from the lens mount. The lens mounting detector 31 detects whether the taking lens is mounted on the lens mount. The movement of the tremble correction optical member is controlled responsively to a change in the state of either the lens mounting detector 31 or the lens change switch 30. Furthermore, a photography mode setting unit 33 enabling selection of any of various photography modes for photography of an object and selection of a tremble correction mode is connected to the operation control unit 101. Based on the selection of a photography mode by the photography mode setting unit 33, it is determined whether tremble correction should be executed using the tremble correction optical member 14.

To be more specific, when a taking lens is mounted on the lens mount on the camera body, the lens mounting detector 31 detects that the taking lens has been mounted, and transfers the information to the operation control means 101. The operation control means 101 judges whether the photography mode setting unit 33 has selected the tremble correction mode as a current photography mode. If the tremble correction mode has been selected, the tremble correction optical member 14 is initialized. The operation control means 101 inclines the tremble correction optical member 14 according to the degree of a hand tremble detected by the tremble detection sensor.

On the other hand, when a taking lens must be dismounted from the lens mount of the camera body, the lens change switch 30 is pressed. The lens mounting detector 31 detects that no taking lens is mounted. Information of the press of the lens change switch 30 and the fact that the lens mounting detector 31 has detected that the taking lens is unmounted are transferred to the operation control unit 101. The operation control means 101 having received the fact that the taking lens is unmounted locks the tremble correction optical member 14 to prevent an unnecessary movement of the tremble correction optical member 14 and judge a selected photography mode by the photography mode setting unit 33.

Figure 3:
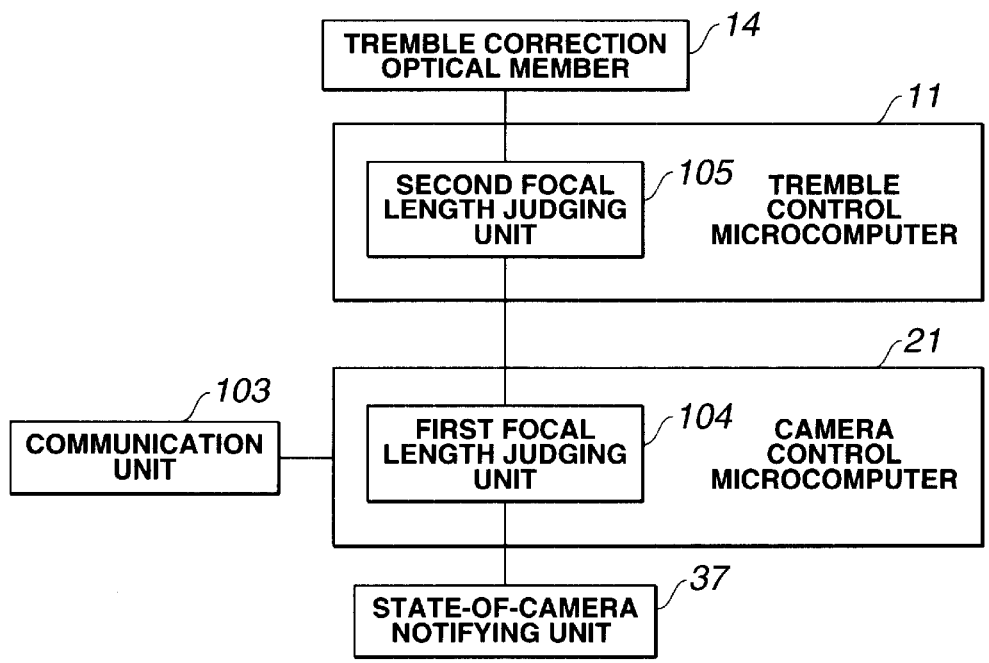
FIG. 3 is a block diagram showing the relationship between the tremble correction optical member and first and second focal length judging units that are employed in the camera in accordance with the present invention.

FIG. 3 is an explanatory block diagram showing the relationship between first and second focal length judging units.

The tremble correction optical member 14 interposed between the lens mount of the camera body and the quick return mirror is inclined or displaced under control of the tremble control microcomputer 11, whereby an object image in the image formation field on film is shifted. The tremble control microcomputer 11 produces a signal, which is used to correct a hand tremble, according to an output of the tremble detection sensor (not shown) and a focal length exhibited by a taking lens. The tremble control microcomputer 11 thus controls the movement of the tremble correction optical member 14 for the purpose of correcting a hand tremble.

The tremble control microcomputer 11 is connected to a camera control microcomputer 21 that controls all the photography-related components of the camera. The camera control microcomputer 21 controls actions to be performed in the camera and manipulations performed on the camera. The tremble control microcomputer 11 corrects a hand tremble under control of the camera control microcomputer 21. A state-of-camera notifying unit 37 and a communication unit 103 are connected to the camera control microcomputer 21. The state-of-camera notifying unit 37 indicates an operating state of the camera so as to notify a photographer of the operating state. The communication unit 103 is an interface that enables communication of various kinds of control information to or from any of electric circuits which control and drive various lens drivers that are not shown and included in taking lenses. The camera control microcomputer 21 includes a first focal length judging unit 104, and thus acquires a current focal length of a taking lens via the communication unit 103. The camera control computer 21 compares the acquired current focal length with a predetermined value to judge whether the taking lens is in focus, and allows the state-of-camera notifying unit 37 to indicate or notify the state of the camera. The tremble control microcomputer 11 includes a second focal length judging unit 105, and compares the current focal length of the taking lens transferred from the camera control microcomputer 21 with a predetermined value so as to control the movement of the tremble correction optical member 14 to be made for correction.

Specifically, the camera control microcomputer 21 communicates with any of interchangeable taking lenses, which are not shown, via the communication unit 103, and thus acquires a focal length currently exhibited by a selected taking lens. If the first focal length judging unit 104 judges that the photography mode of the camera is set to the tremble correction mode and that the acquired focal length falls outside a predetermined range, an indication of a warning is displayed on the state-of-camera notifying unit 37. If the focal length is extremely large, it falls outside the range of focal lengths permitting tremble correction. There is therefore a fear that the tremble correction optical member 14 may traverse a permissible space and may be broken. In contrast, if the focal length is extremely small, the tremble correction optical member 14 moves a large distance. Consequently, aberration occurs irrespective of a hand tremble, and optical performance deteriorates. Therefore, when the focal length falls outside the predetermined range, a warning indicating that a sufficient tremble correction space is unavailable is given in order to restrict the movement of the tremble correction optical member to be made for tremble correction.

When the photography mode of the camera is set to the tremble correction mode, the focal length is also transferred to the tremble control microcomputer 11, and used to correct a tremble in a pickup image derived from a hand tremble. The focal length is then transferred to the second focal length judging unit 105. The second focal length judging unit 105 judges whether the focal length falls within the predetermined range. The judgment is the same as that made by the first focal length judging unit 104. If the focal length falls outside the predetermined range, the movement of the tremble correction optical member 14 to be made for correction is restricted.

Figure 4:
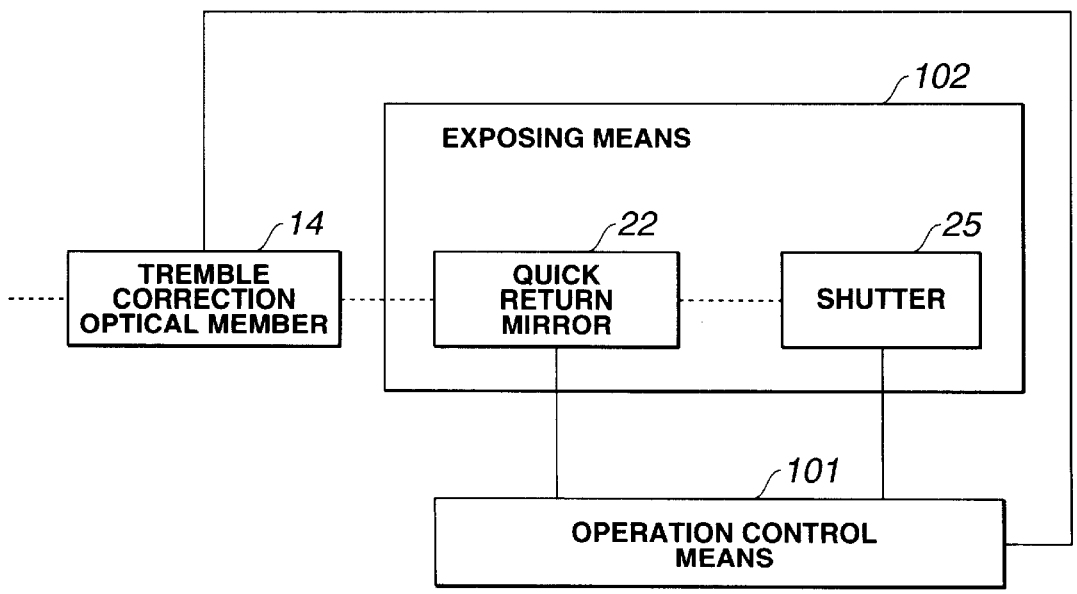
FIG. 4 is a block diagram showing the relationship between the tremble correction optical member and an exposing means that are employed in the camera in accordance with the present invention.

FIG. 4 shows the relationship between the tremble correction optical member and an exposing means.

The tremble correction optical member 14 is located on the optical axis of a pickup image projected from a taking lens. An exposing means 102 is located behind the tremble correction optical member 14. The exposing means 102 consists of a quick return mirror 22 located on the optical axis of a pickup image and a shutter 25 that exposes film to the pickup image for a predetermined period of time and thus projects the pickup image on film. The tremble correction optical member 14 and the quick return mirror 22 and shutter 25 included in the exposing means 102 are controlled and driven by the operation control means 101. The operation control means 101 is realized with a microcomputer incorporated in the camera body as mentioned previously, and composed of a unit for controlling the whole camera and a unit for controlling the movement of the tremble correction optical member to be made for tremble correction.

When a photographer uses a photography start member, which is not shown, to instruct start of photography, the quick return mirror 22 pivots upwards. Thereafter, the shutter 25 opens to start exposure of film (the front curtain of the shutter moves). When a predetermined exposure time elapses, the shutter 25 closes to terminate exposure of film (the rear curtain of the shutter moves). When exposure is completed, the quick return mirror 22 pivots downwards. Thus, a series of movements for exposure is completed.

Figure 6:
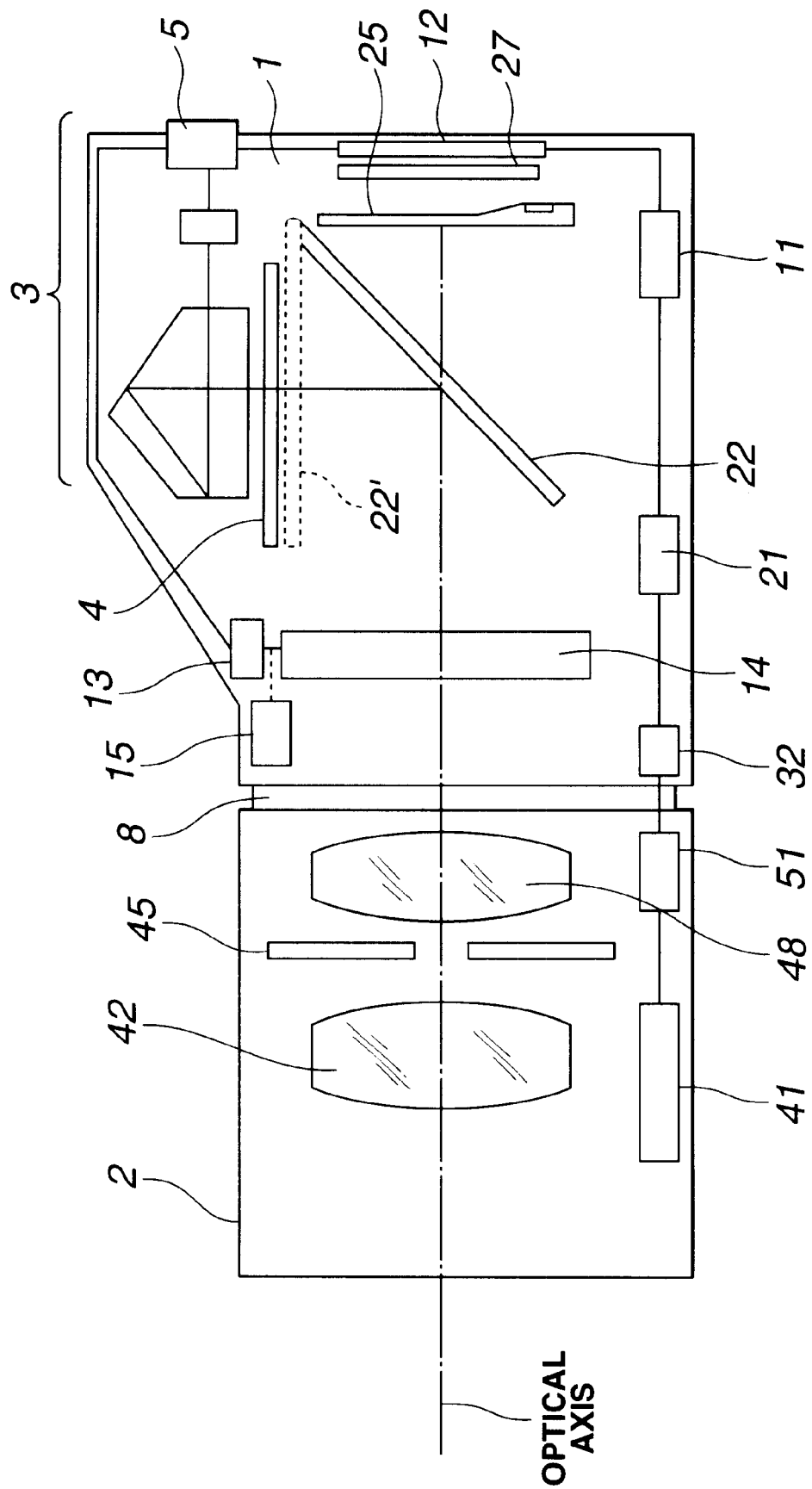
FIG. 6 is a side view of the camera in accordance with the present invention showing the internal components of a camera body and a taking lens.
Figure 23:
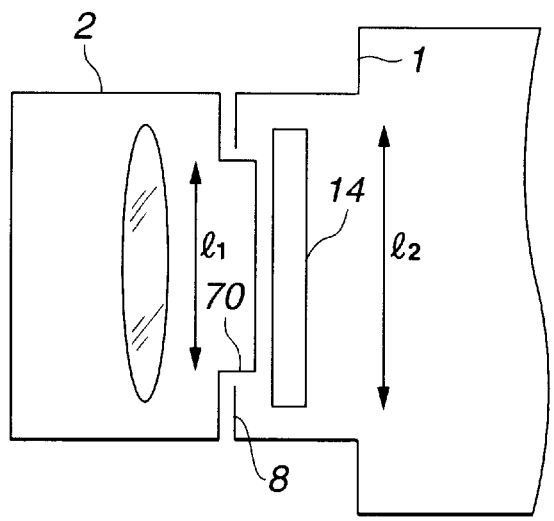
FIG. 23, FIG. 23A, and FIG. 23B are explanatory diagrams concerning a movable area for the tremble correction optical member included in the camera in accordance with the present invention.

Throughout the exposure, even before and after the exposure, the tremble correction optical member 14 keeps moving for the purpose of tremble correction. If the tremble correction optical member 14 and quick return mirror 22 are located mutually closely as shown in FIG. 6 or FIG. 23, the quick return mirror 22 may interfere with the tremble correction optical member 14 when pivoting upwards or downwards. Therefore, the tremble correction camera in accordance with the present invention restricts the movement of the tremble correction optical member 14 when the quick return mirror 22 pivots upwards or downwards. Specifically, the present absolute position of the tremble correction optical member 14 is judged. If there is the fear that the quick return mirror 22 may interfere with the tremble correction optical member 14, the position of the tremble correction optical member 14 is changed. When the upward or downward pivoting of the quick return mirror 22 is completed, the tremble correction optical member 14 is restored to a state attained before the movement thereof is restricted. Thus, the interference of the quick return mirror 22 with the tremble correction optical member 14, that is, the contact thereof therewith is prevented.

Figure 5:
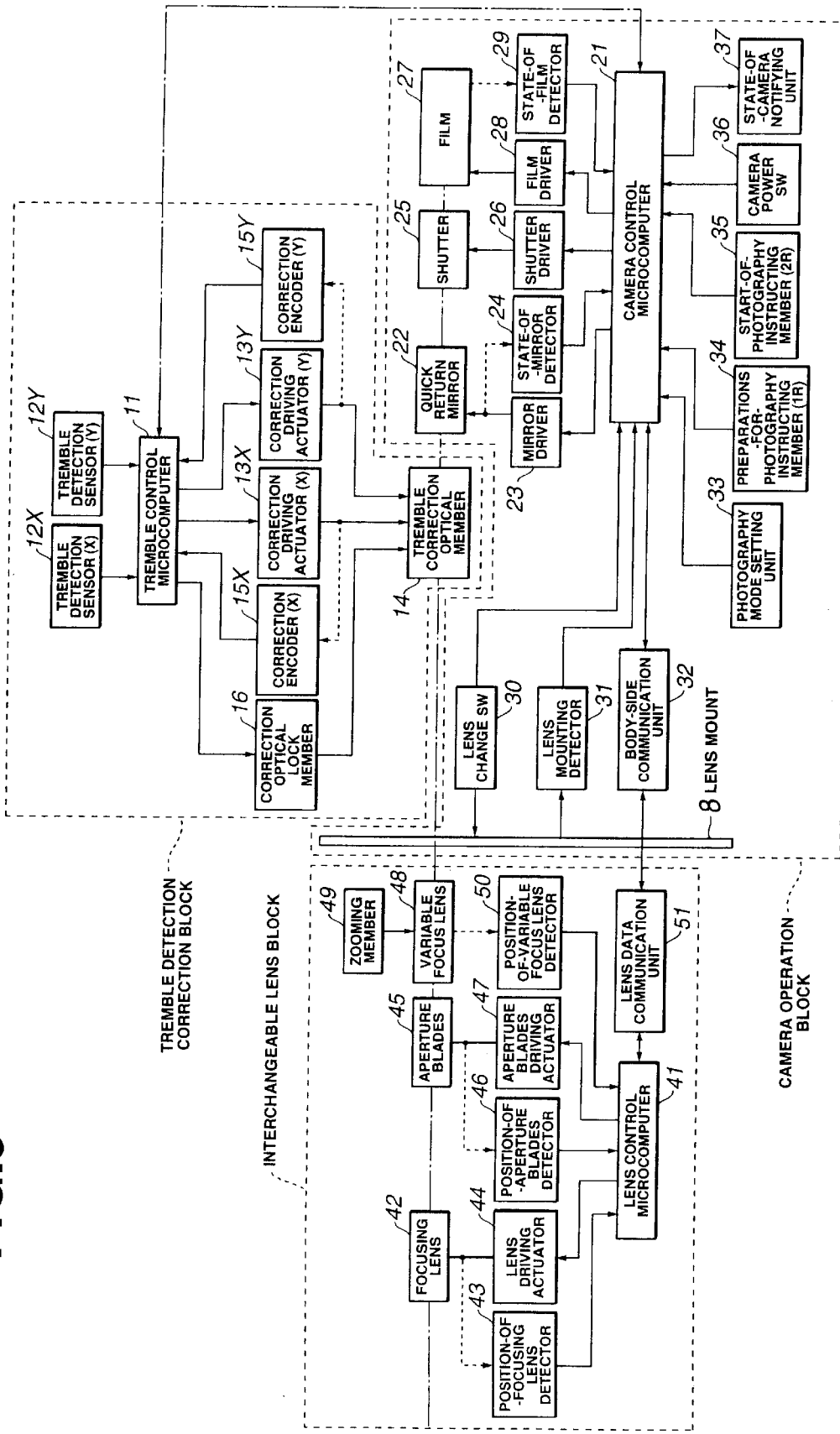
FIG. 5 is a block diagram showing the overall configuration of the camera in accordance with the present invention for an explanatory purpose.

Next, the overall configuration of the camera in accordance with the present invention will be described in conjunction with FIG. 5.

The camera in accordance with the present invention consists mainly of a camera action block that determines the capability of a camera, a tremble detection/correction block that detects and corrects a tremble, and an interchangeable lens block that is any of interchangeable taking lenses. The blocks each include a microcomputer responsible for control, that is, the blocks include the camera control microcomputer 21, tremble control microcomputer 11, and lens control microcomputer 41 respectively. The camera control microcomputer 21 is connected to the tremble control microcomputer 11 and to the lens control microcomputer 41, and controls all the actions to be performed within the camera.

The camera action block has the quick return mirror 22 located on the optical axis of a taking lens that is the taking lens block to be described later. The quick return mirror 22 pivots upwards or downwards so as to guide light reflected from an object onto film. The quick return mirror 22 is driven by a mirror driver 23 under control of the camera control microcomputer 21. A state-of-mirror detector 24 detects whether the quick return mirror 22 has pivoted upwards or downwards, and transfers the current state of the quick return mirror 22 to the camera control microcomputer 21. The shutter 25 is located behind the quick return mirror 22 along the optical axis. The shutter 25 is driven by a shutter driver 26 under control of the camera control microcomputer 21. Film 27 that is exposed to light reflected from an object and on which an image of the object is recorded is located behind the shutter 25 along the optical axis. The film 27 is driven by a film driver 28 under control of the camera control microcomputer 21, whereby winding or rewinding of the film 27 is controlled. Furthermore, a state-of-film detector 29 detects the state of the film 27 and transfers the state of the film 27 to the camera control microcomputer 21.

The quick return mirror 22 and shutter 25 are used to expose the film 27 to light reflected from an object.

The lens change switch 30, the lens mounting detector 31, and a body-side communication unit 32 are connected to the camera control microcomputer 21. The lens change switch 30 is a switch to be used to detach a taking lens from the camera body. The lens mounting detector 31 is a switch that detects whether any of interchangeable taking lenses is attached to the camera body. The body-side communication unit 32 is realized with the electric contacts of a communication interface that is formed on the camera body and enables communication to the lens control microcomputer 41 included in the interchangeable lens block.

The photography mode setting unit 33, a preparations-for-photography instructing member (1R) 34, a start-ofphotography instructing member (2R) 35, a camera power switch 36, and the state-of-camera notifying unit 37 are connected to the camera control microcomputer 21. The photography mode setting unit 33 enables selection of any of photography modes, for example, an automatic focusing mode, an automatic exposure mode, and a flashing mode. The photography mode setting unit 33 also enables selection of a mode in which tremble correction photography in accordance with the present invention is carried out. The preparations-for-photography instructing member (1R) 34 is a push-button switch to be pressed in order to instruct that preparations should be made for photography prior to exposure. Namely, a luminance/distance measuring means that is not shown is activated in order to measure the luminance of an object or a distance to an object. In general, when a release switch is pressed halfway, a first release switch (1R) is turned on in order to instruct that preparations should be made for photography. The start-of-photography instructing member (2R) 35 sets a shutter driving speed at which the shutter 25 is driven, and determines an f-number that depends on the size of an aperture stop defined by aperture blades 45 included in the taking lens block which will be described later. Moreover, the start-of-photography instructing member (2R) 35 is a push-button switch to be pressed in order to cause the quick return mirror 22 to pivot upwards, to drive the shutter 25, and to thus instruct that photography should be started to expose the film 27 to light reflected from an object. In general, when the release switch that is held halfway is further pressed, the second release switch (2R) is turned on in order to instruct start of photography. The camera power switch 36 is a switch to be pressed in order to supply power from a battery, which is not shown, for the purpose of driving various drivers and detectors including the camera control microcomputer 21 and also driving the tremble detection/correction block and taking lens block. The state-of-camera notifying unit 37 uses a display device located on the top of the camera body or included in the viewfinder to notify a photographer of a shutter speed (sec) and an f-number, which are conditions for photography, and a photography mode recognized by the photography mode setting unit 33.

The tremble detection/correction block includes the tremble control microcomputer 11 connected to the camera control microcomputer 21. The tremble detection/correction block detects a vibration of the camera derived from a hand tremble, and controls the movement of the tremble correction optical member to be made for tremble correction in order to prevent occurrence of a tremble in a pickup image due to a hand tremble. The tremble control microcomputer 11 controls actions in response to an instruction issued from the camera control microcomputer 21. The camera control microcomputer 21 communicates with the lens control microcomputer 41 so as to acquire a focal length. The tremble control microcomputer 11 then fetches the focal length and uses the focal length to correct a hand tremble.

A tremble detection sensor 12, a correction driving actuator 13, a correction encoder 15, and a correction optical member lock member 16 are connected to the tremble control microcomputer 11. The correction driving actuator 13 and correction optical member lock member 16 are connected to the tremble correction optical member 14.

The tremble detection sensor 12 consists of a tremble detection sensor (X) 12X and a tremble detection sensor (Y) 12Y. The tremble detection sensor (X) 12X detects a hand tremble that occurs in a direction corresponding to the direction of the axis of abscissas (X axis) of a coordinate system defined on film. The tremble detection sensor (Y) 12Y detects a hand tremble that occurs in a direction corresponding to the direction of the axis of ordinates (Y axis) of the coordinate system defined on film. The tremble detection sensors 12X and 12Y are realized with known angular speed sensors (vibration gyroscopes). A hand tremble detected by the tremble detection sensor 12X or 12Y is transferred to the tremble control microcomputer 11. The tremble control microcomputer 11 filters a noise to thus eliminate the noise that has nothing to do with the hand tremble. The tremble control microcomputer 11 then produces a control signal, which causes the tremble correction optical member to move for tremble correction, according to the hand tremble and the output information of the correction encoder 15 that will be described later. The correction driving actuator 13 drives the tremble correction optical member 14 so that the tremble correction optical member 14 will move for the purpose of tremble correction. The correction driving actuator 13 consists of a correction driving actuator (X) 13X that moves the tremble correction optical member in a direction corresponding to the direction of the axis of abscissas (X axis) of the coordinate system defined on the film 27, and a correction driving actuator (Y) 13Y that moves the tremble correction optical member in a direction corresponding to the direction of the axis of ordinates (Y axis) thereof. The correction driving actuators 13X and 13Y are realized with typical actuators such as DC motors or voice coils.

The tremble correction optical member 14 moves when driven by the correction driving actuators 13X and 13Y, and thus shifts a pickup image in the exposed field on the film 27. The tremble correction optical member 14 is placed along the optical axis of a taking lens between the lens mount 8 and the quick return mirror 22. The taking lens block is attached to the camera action block while being mounted on the mount 8. The tremble correction optical member 14 is moved in order to correct a tremble in an image in the exposed field on the film 27 which is derived from a hand tremble. In practice, a lens may be inclined in order to shift an image or a lens is moved in a direction perpendicular to the optical axis of a taking lens in order to shift an image. According to the present embodiment of the present invention, parallel glass plates that exhibit no power are used as the tremble correction optical member and inclined in order to shift an image.

The correction encoder 15 consists of a correction encoder (X) 15X and a correction encoder (Y) 15Y. The correction encoder (X) 15X detects a movement of the tremble correction optical member 14 made in a direction that corresponds to the direction of the axis of abscissas (X axis) of the coordinate system defined on the film 27. The correction encoder (Y) 15Y detects a movement of the tremble correction optical member 14 made in a direction that corresponds to the direction of the axis of ordinates (Y axis) of the coordinate system defined on the film 27. The correction encoders 15X and 15Y are realized with position detecting elements such as a photo-interrupter and a photo-reflector, or an infrared light emitting diode and an optical position detection element. A movement made by the tremble correction optical member 14 and detected by the correction encoder 15 is transferred to the tremble control microcomputer 11. The tremble control microcomputer 11 produces a correction driving control signal used to drive the tremble correction optical member 14 for the purpose of correction.

The correction optical member lock member 16 locks the tremble correction optical member 14 at a predetermined position for fear the tremble correction optical member 14 may be driven accidentally when any of interchangeable taking lenses is attached to or detached from the camera body.

The interchangeable lens block includes the lens control microcomputer 41 incorporated in a taking lens. The lens control microcomputer 41 communicates with the camera control microcomputer 21 incorporated in the camera body. The lens control microcomputer 41 transfers a focusing lens driving instruction or an aperture blades driving instruction to or from the camera control microcomputer 21, or transmits a focal length currently exhibited by a taking lens thereto. The focusing lens driving instruction or aperture blades driving instruction is transferred in order to focus the camera.

The taking lens block includes a focusing lens 42 and a variable power lens 48 as a group of taking lenses that pick up light reflected from an object. The aperture blades 45 are interposed between the focusing lens 42 and variable power lens 48. The taking lens block can be mounted on or dismounted from the lens mount 8 formed on the camera body.

The focusing lens 42 is driven in optical-axis directions in order to focus light reflected from an object. The focusing lens 42 is moved in order to converge an object image on the exposed field on the film 27. The variable power lens 48 is moved in the optical-axis directions in order to change focal lengths.

A position-of-focusing lens detector 43, a lens driving actuator 44, a position-of-aperture blades detector 46, an aperture blades driving actuator 47, a position-of-variable power lens detector 50, and a lens data communication unit 51 are connected to the lens control microcomputer 41.

The position-of-focusing lens detector 43 detects the current position of the focusing lens 42, and transfers the position to the lens control microcomputer 41. The position-of-focusing lens detector 43 is realized with, for example, a photo-interrupter and a photo-reflector. The lens driving actuator 44 is realized with, for example, a dc motor in order to drive the focusing lens 42 in the optical-axis directions for the purpose of focusing the camera under control of the lens control microcomputer 41. The position-of-aperture blades detector 46 detects the current state of the aperture blades 45 and transfers the state to the lens control microcomputer 41. The position-of-aperture blades detector 46 is realized with, for example, a photo-interrupter and a photo-reflector. The aperture blades driving actuator 47 drives the aperture blades 45 in response to an instruction given from the camera control microcomputer 21 via the lens control microcomputer 41, and thus controls an amount of light reflected from an object. The aperture blades driving actuator 47 is realized with, for example, a DC motor or a stepper motor.

The variable power lens 48 is driven in the optical-axis directions using a zooming member 49, whereby focal lengths are changed. The zooming member 49 may be driven manually or electrically in order to displace the variable power lens 48. When the zooming member 49 is designed to be motor-driven, an electric motor, an actuator, and a switch are needed. The position-of-variable power lens detector 50 detects the position of the variable power lens 48 on the optical axis of the taking lens, and transfers the detected position to the lens control microcomputer 41. The position-of-variable power lens detector 50 is realized with, for example, a photo-interrupter and a photo-reflector.

The lens data communication unit 51 is realized with the electric contacts of an interface that enables communication of the lens control microcomputer 41 with the camera control microcomputer 21 incorporated in the camera body.

Figure 7:
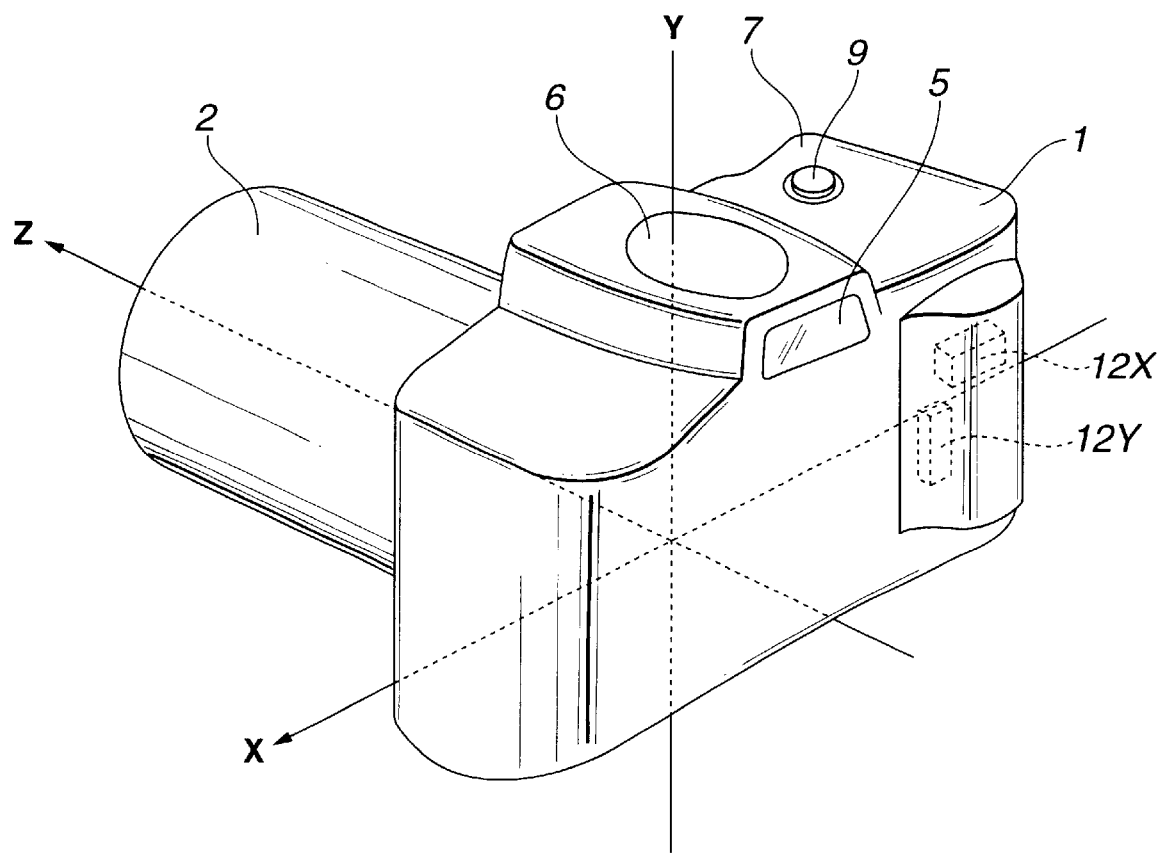
FIG. 7 is a perspective back view showing the appearance of the camera in accordance with the present invention.
Figure 8:
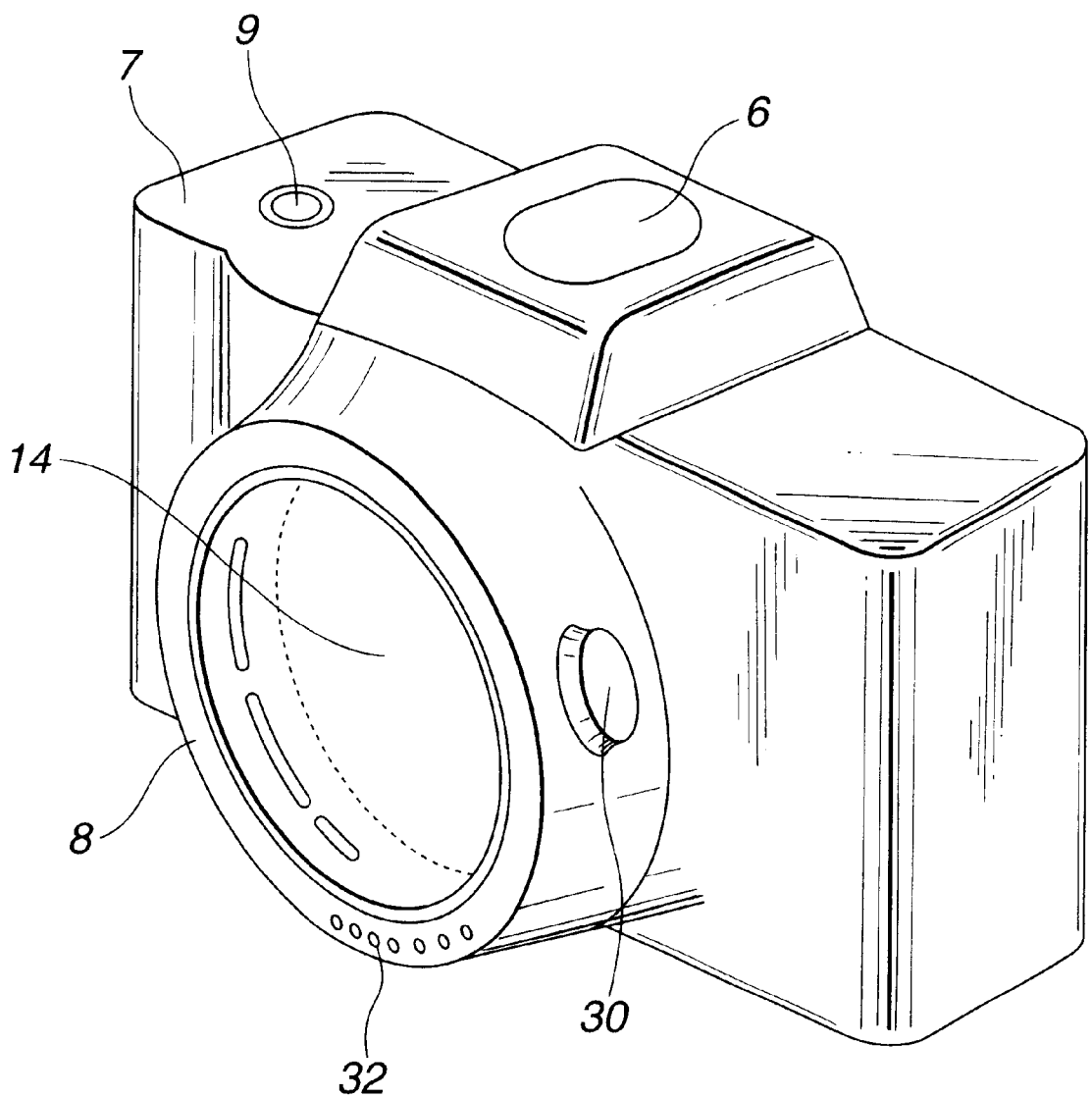
FIG. 8 is a perspective front view showing the appearance of the camera body of the camera in accordance with the present invention.

The incorporated-in components of the camera body of the tremble correction camera in accordance with the present invention, and the external components thereof will be described in conjunction with FIG. 6 to FIG. 8.

The internal components and external components of the camera will be described in conjunction with FIG. 6 to FIG. 8. FIG. 6 is a side view showing the overall configuration of the camera. FIG. 7 is a perspective back view of the camera. FIG. 8 is a perspective front view of the camera with the taking lens detached from the camera body.

The camera in accordance with the present invention consists mainly of the camera body 1 and taking lens 2. The lens mount 8 on which the taking lens 2 is mounted is formed substantially in the center of the face of the camera body 1. The taking lens 2 mounted on the lens mount 8 of the camera body 1 includes the focusing lens 42, aperture blades 45, and variable power lens 48. The taking lens 2 further includes the lens control microcomputer 41 and lens data communication unit 51. Moreover, the position-of-focusing lens detector 43, lens driving actuator 44, position-of-aperture blades detector 46, aperture blades driving actuator 47, position-of-variable power lens detector 50, and zooming member 49 are included in the taking lens 2, though they are not shown.

The tremble correction optical member 14 is located near the lens mount 8, which is a mounting/dismounting member, on the face of the camera body 1 so that a hand tremble can be corrected in directions orthogonal to the optical axis of the optical system including the focusing lens 42 and variable power lens 48 incorporated in the taking lens 2. The quick return mirror 22 is located behind the tremble correction optical member 14 along the optical axis, or more strictly speaking, along the extension of the optical axis. The quick return mirror 22 is positioned in order to introduce or reflect light, which is reflected from an object and propagated from the taking lens 2, into a viewfinder optical system 3 located in the upper part of the camera body 1 in FIG. 6. The quick return mirror 22 pivots upwards in FIG. 6 (indicated with a dashed line 22' in FIG. 6) with one end thereof as a fulcrum. The shutter 25 is located behind the quick return mirror 22 along the optical axis, and the film 27 is located behind the shutter 25 along the optical axis. The light reflected from the object and reflected from the quick return mirror 22 is projected on a screen 4. An object image projected on the screen 4 is converted into an erect image by a pentagonal prism. A photographer can now observe the object through an eyepiece 5. The correction driving actuator 13 and correction encoder 15 are located around the tremble correction optical member 14. Furthermore, the body-side communication unit 32 and the camera control microcomputer 21 are incorporated in the camera body 1. The body-side communication unit 32 is joined with the lens data communication unit 51 when the taking lens 2 has been mounted on the lens mount 8. Furthermore, various drivers and detectors that are not shown and connected to the camera control microcomputer 21 are incorporated in the camera body 1, and the tremble control microcomputer 11 is incorporated in the camera body 1. The tremble detection sensor 12 is located near the back of the camera body 1.

A strobe stowage 6 is located in the upper central part of the camera body 1. When an object exhibits a low luminance level, the strobe stowage 6 pops up to radiate strobe light. A release button 9 is exposed on the top of the camera body 1, seen left from the face side of the camera body, and seen right from the back side thereof. The portion of the camera body 1 on the top of which the release button 9 is exposed has a grip 7 formed in order to help a photographer hold the camera body 1. The tremble detection sensor 12X and tremble detection sensor 12Y constituting the tremble detection sensor 12 are incorporated in the grip 7. The tremble detection sensor 12X detects a hand tremble that occurs in the direction of the axis of abscissas (X directions, and the tremble detection sensor 12Y detects a hand tremble that occurs in the direction of the axis of ordinates (Y direction). The lens change switch 30, to be pressed in order to dismount the taking lens 2 from the lens mount 8 so as to change the taking lens 2 to another, is located on the periphery of the lens mount 8 on the face of the camera body 1.

Next, a mechanism for driving the tremble correction optical member 14 will be described in conjunction with FIG. 9 and FIG. 9A.

Figure 9:
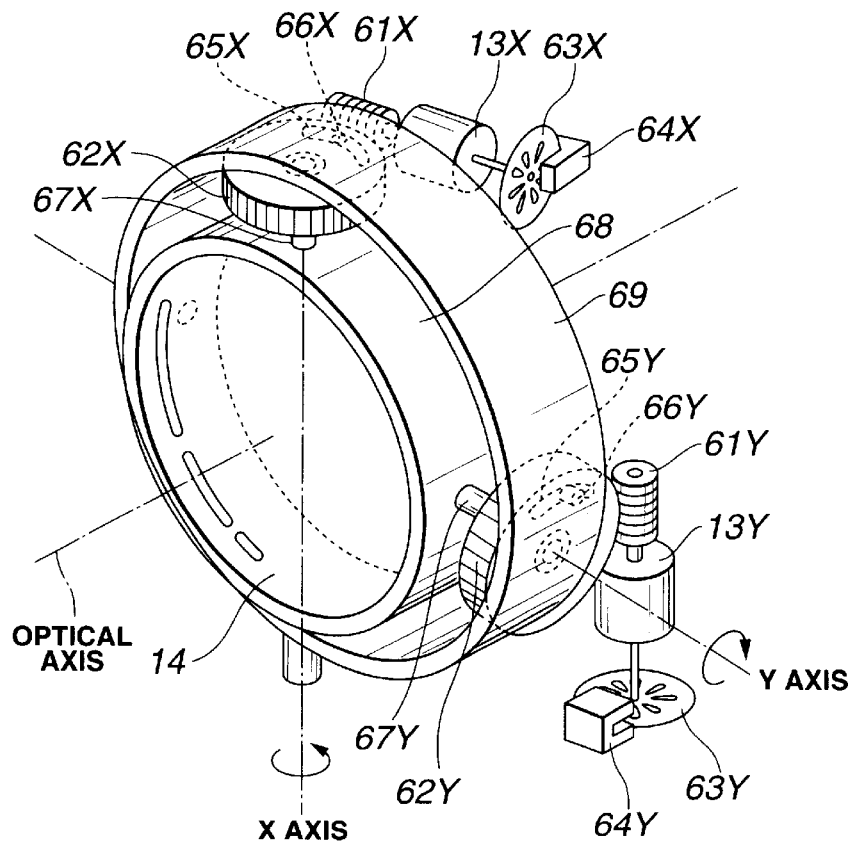
FIG. 9 is a perspective front view showing the tremble correction optical member of the camera in accordance with the present invention.

FIG. 9 shows the driving mechanism. In the camera in accordance with the present invention, gimbals are used to incline the tremble correction optical member 14, that is realized with parallel glass plates, according to the degree of a vibration of the camera. Thus, a shift of an image caused by the parallel glass plates will cancel out a displacement of the image caused by a hand tremble. A mechanism for driving the tremble correction optical member in the direction of the axis of abscissas (that corresponds to the X axis in FIG. 9 and shall be referred to as the X axis) is identical to a mechanism for driving it in the direction of the axis of ordinates (that corresponds to the Y axis in FIG. 9 and shall be referred to as the Y axis). Therefore, a description will be made solely of the mechanism for driving the tremble correction optical member about the Y axis or along the axis of abscissas (x axis).

The tremble correction optical member 14 is realized with parallel glass plates and borne by an inner frame 68. The inner frame 68 is suspended by a rotation shaft 67X fixed to a gear 62X. The inner frame 68 can rotate freely with respect to an outer frame 69. The gear 62X is meshed with a worm gear 61X. The correction driving actuator (X) 13X is fixed to the shaft of the worm gear 61. The rotation of the correction driving actuator (X) 13X is conveyed to the tremble correction optical member 14 held in the inner frame 68 by way of the worm gear 61X, gear 62X, and rotation-shaft 67X. The tremble correction optical member 14 then rotates about the X axis. A disk 63X having a plurality of slits, which pierce through the disk 63X, formed equidistantly therein is fixed to the rotation shaft of the correction driving actuator (X) 13X. A photo-interrupter/photo-reflector pair 64X is placed with the disk 63X between them. When the correction driving actuator (X) 13X rotates, every time each slit of the disk 63X traverses the paired photo-interrupter and photo-reflector 64X, a pulse is generated. The amount of rotation of the correction driving actuator (X) 13X is inferred from the number of detected pulses, and a rotating speed can be inferred from the number of detected pulses over a time period. Consequently, a magnitude of rotation by which the paralleled glass plates constituting the tremble correction optical member 14 have rotated is inferred. Incidentally, a groove 65X is formed in the planar part of the gear 62X, and a pin 66X to be fitted in the groove 65X is embedded in the outer frame 69. The groove 65X and pin 66X restrict ranges of rotation by which the gear 62X and inner frame 68 are permitted to rotate.

In other words, when the correction driving actuator 13X rotates in opposite directions, the inner frame 68 that holds the tremble correction optical member 14 rotates with the X axis as a center owing to the worm gear 61X and gear 62X. The rotation about the Y axis of the inner frame 68 is restricted by the pin 66X fitted in the groove 65X. The magnitude of rotation is inferred from the number of pulses generated responsively to detection of each slit of the disk 63X by the paired photo-interrupter and photo-reflector 64X. The mechanism for driving the tremble correction optical member along the Y axis (or about the X axis) is the same as the foregoing mechanism for driving the tremble correction optical member along the X axis. Reference numerals with Y appended thereto are assigned to the counterparts of the foregoing components.

The drivers included in the foregoing mechanisms for driving the tremble correction optical member are located near the upper parts of the inner frame 68 and outer frame 69 and near the right-hand parts thereof respectively. This is because the grip 7 is formed as the left-hand part of the camera when seen from the face side of the taking lens 2. The grip 7 is held by the photographer's right hand. Besides, many windows for auxiliary optical elements required for automatic focusing are usually arranged in the left-hand part of the camera. Therefore, a space large enough to place the driving mechanisms is hardly preserved in the left-hand part of the camera. Moreover, there is no extra space in the lower part of the camera that is seen below the face of the taking lens 2. The upper-part of the camera includes a convex part in which the strobe unit is located and has therefore an extra space. The positions of the mechanisms for driving the tremble correction optical member in the camera body 1 are not limited to the aforesaid positions, but may be varied depending on the arrangement of various mechanisms in the camera body.

Next, the principles of tremble correction to be performed using the tremble correction optical member 14 realized with the parallel glass plates will be described in conjunction with FIG. 9A.

Figure 9A:
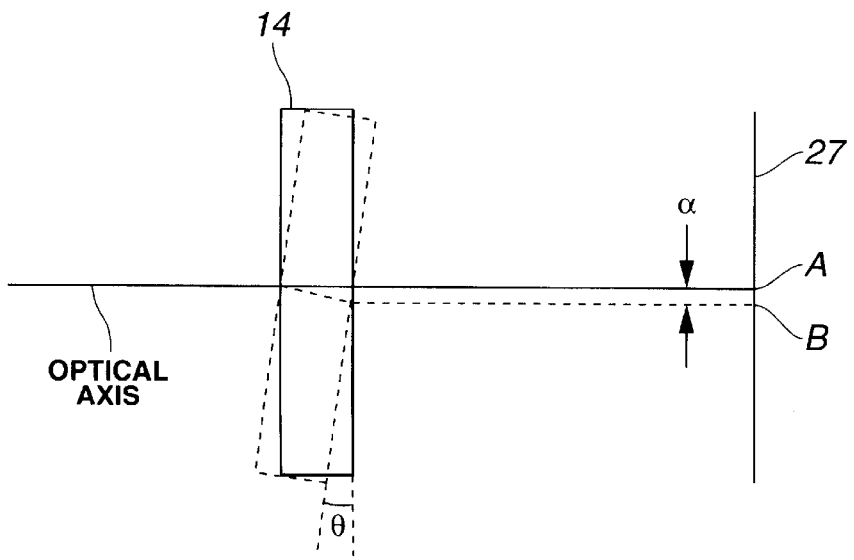
FIG. 9A is an explanatory diagram concerning the ability of the tremble correction optical member of the camera in accordance with the present invention.

Referring to FIG. 9A, solid lines indicate the contour of the tremble correction optical member 14 and a light path attained when it is unnecessary to correct a hand tremble. The tremble correction optical member 14 realized with the paralleled glass plates is located perpendicularly to the optical axis of the optical system incorporated in the taking lens. Light passing through the center of the tremble correction optical member 14 is converged at position A on the film 27. In contrast, dashed lines indicate the contour of the tremble correction optical member 14 and a light path attained when the tremble correction optical member 14 is inclined by an angle θ. Light passing through the center of the tremble correction optical member 14 is converged at position B on the film 27 that is deviated by α from position A.

The hand tremble correction control microcomputer 11 inclines the tremble correction optical member 14 to cancel the deviation α by which the image-formed position on film is deviated because of a hand tremble.

Actions to be performed in the camera having the aforesaid components will be described in conjunction with FIG. 10 to FIG. 22. FIG. 10 to FIG. 22 mainly describe actions relevant to tremble correction that is concerned with the present invention. The description of actions that have nothing to do with the present invention will be omitted. First, control of actions by the camera control microcomputer will be described in conjunction with FIG. 10 to FIG. 16.

Figure 10:
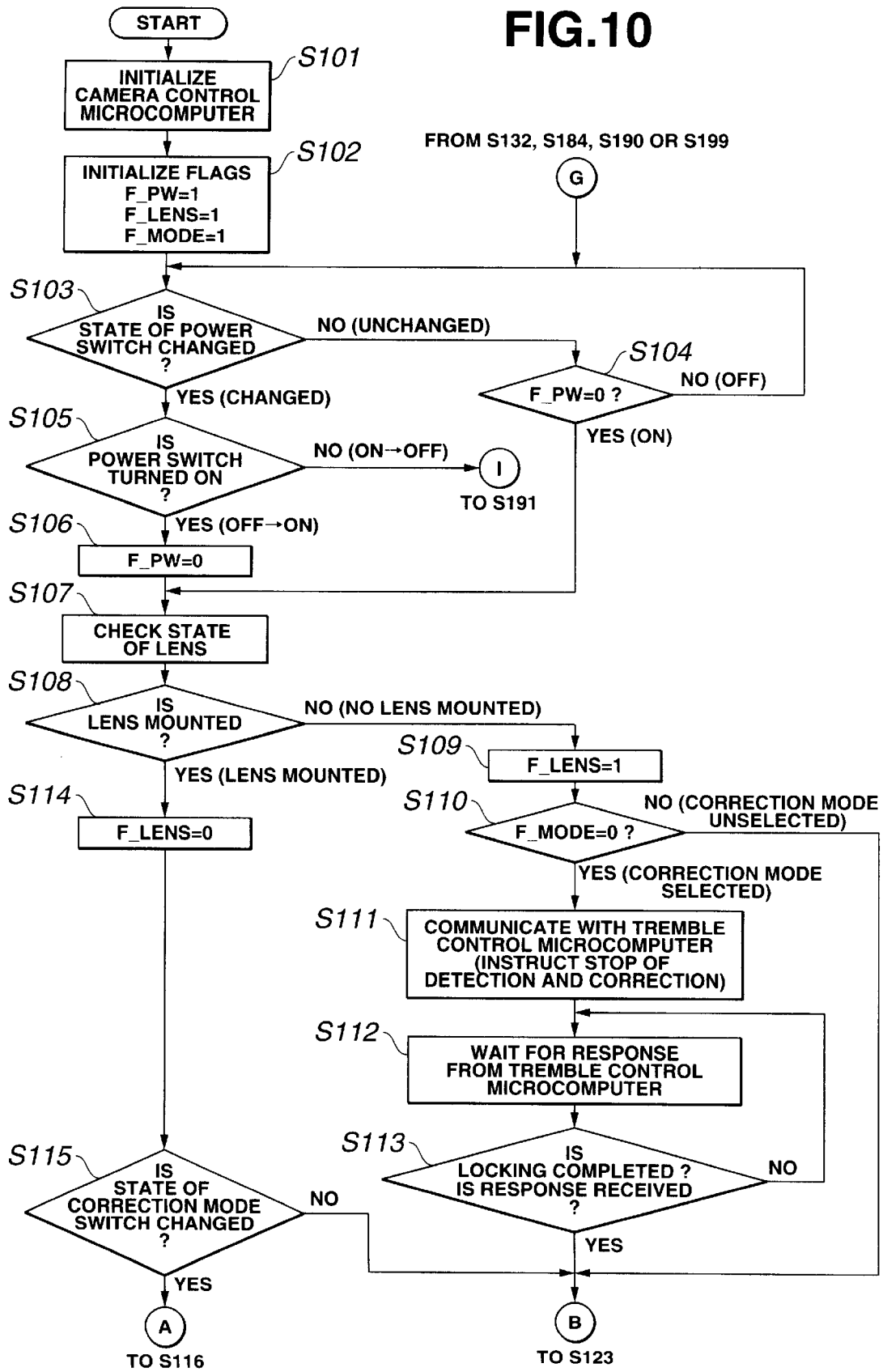
FIG. 10 is a flowchart describing control actions to be performed by a camera control microcomputer incorporated in the camera in accordance with the present invention.

Referring to FIG. 10, the camera control microcomputer 21 is initialized at step S101. At step S102, flags relevant to the present invention are initialized. The flags include a flag F_PW that indicates the state of the camera power switch 36. When the camera power switch 36 is turned off, the flag F_PW is set to 1. When the camera power switch 36 is turned on, the flag F_PW is reset to 0. When it says that the flag F_PW is initialized, it means that the flag F_PW is set to 1 in order to indicate that the camera power switch 36 is off. Moreover, when the taking lens 2 is not mounted on the lens mount 8 on the camera body 1, a flag F_LENS indicating whether the taking lens 2 is mounted is set to 1. When the taking lens 2 has been mounted on the lens mount 8, the flag F_LENS is reset to 0. Initially, the flag F_LENS is set to 1 in order to indicate that the taking lens 2 is unmounted. Moreover, a flag F_MODE indicates that the tremble correction mode has been selected from among various photography modes of the camera and recognized by the photography mode setting unit 33. If the tremble correction mode is unselected, the flag F_MODE is set to 1. If the tremble correction mode is selected, the flag F_MODE is reset to 0. Initially, the flag F_MODE is set to 1 in order to indicate that the tremble correction mode is unselected.

At step S103, it is judged whether the camera power switch 36 is turned on or off, or anyhow, manipulated. If it is judged that the camera power switch 36 is manipulated, it is judged at step S105 whether the camera power switch 36 is turned on. If it is judged that the camera power switch 36 is turned on, the flag F_PW that indicates the state of the camera power switch 36 is reset to 0 at step S106.

If it is judged at step S103 that the camera power switch 36 is not manipulated, it is judged at step S104 whether the flag F_PW that indicates the state of the camera power switch 36 is reset to 0. Namely, if the F_PW is reset to 0 in order to indicate that the camera power switch 36 is on, step S107 and subsequent steps are carried out. If it is judged that the F_PW is not reset to 0 but set to 1 in order to indicate that the camera power switch 36 is off, control is returned to step S103. If it is judged at step S105 that the camera power switch 36 is turned off, step S191 and subsequent steps are carried out.

If it is judged at step S106 or S104 that the flag F_PW is reset to 0 in order to indicate that the camera power switch 36 is on, the lens mounting detector 31 checks if a taking lens 2 is mounted on the lens mount 8 on the camera body 1. It is judged at step S108 whether a taking lens 2 is mounted. If it is judged that a taking lens 2 has been mounted, step S114 and subsequent steps are carried out. If it is judged that no taking lens 2 is mounted, the flag F_LENS is set to 1 in order to indicate that no taking lens 2 is mounted. It is judged at step S110 whether the flag F_MODE is set or reset, whereby it is checked if the tremble correction mode is selected. If it is judged that the flag F_MODE is set to 1 in order to indicate that the tremble correction mode is unselected, step S123 and subsequent steps are carried out. If it is judged that the flag F_MODE is reset to 0 in order to indicate that the tremble correction mode has been selected, the tremble control microcomputer 11 is instructed to suspend tremble detection and correction.

If no taking lens 2 is mounted on the lens mount 8, the camera control microcomputer communicates with the tremble control microcomputer 11 at step S111. The camera control microcomputer instructs the tremble control microcomputer 11 to suspend tremble detection and correction and to lock the tremble correction optical member 14 so as to protect the tremble correction optical member 14. This is intended to prevent the tremble correction optical member from being broken when a user touches the tremble correction optical member 14 by mistake when no taking lens 2 is mounted.

At step S108 of checking if a taking lens 2 is mounted, it is checked if a taking lens 2 is mounted on the lens mount 8 on the camera body 1. Furthermore, even when the taking lens 2 has been mounted, it may be checked if the taking lens 2 is mounted incorrectly—that is, not mounted at a predetermined position. If the taking lens has not been mounted at the predetermined position, it is judged at step S108 that no taking lens is mounted. Thus, the tremble correction optical member 14 can be prevented from being broken because the taking lens 2 has been mounted incorrectly—that is, has not been mounted at the predetermined position.

Thereafter, at step S112, the camera control microcomputer waits until the tremble control microcomputer 11 drives the correction optical member lock member 16 so as to lock the tremble correction optical member 14 and suspend tremble detection and correction. It is judged at step S113 whether a response to the instruction that tremble detection and correction should be suspended is received from the tremble control microcomputer 11. If the response to the instruction that tremble detection and correction should be suspended is not received, control is returned to step S112. If it is confirmed that the tremble correction optical member 14 has been locked and that a response saying that tremble detection and correction has terminated is received, step S123 and subsequent steps are carried out.

If it is judged at step S108 that a taking lens 2 has been (properly) mounted on the lens mount 8, the flag F_LENS is reset to 0 at step S114 in order to indicate that the taking lens 2 has been mounted. At step S115, it is judged whether a tremble correction mode switch included in the photography mode setting unit 33 is pressed. If it is judged that the tremble correction mode switch is not pressed, step S123 and subsequent steps are carried out. If it is judged that the tremble correction mode switch has been pressed, step S116 and subsequent steps are carried out.

Figure 11:
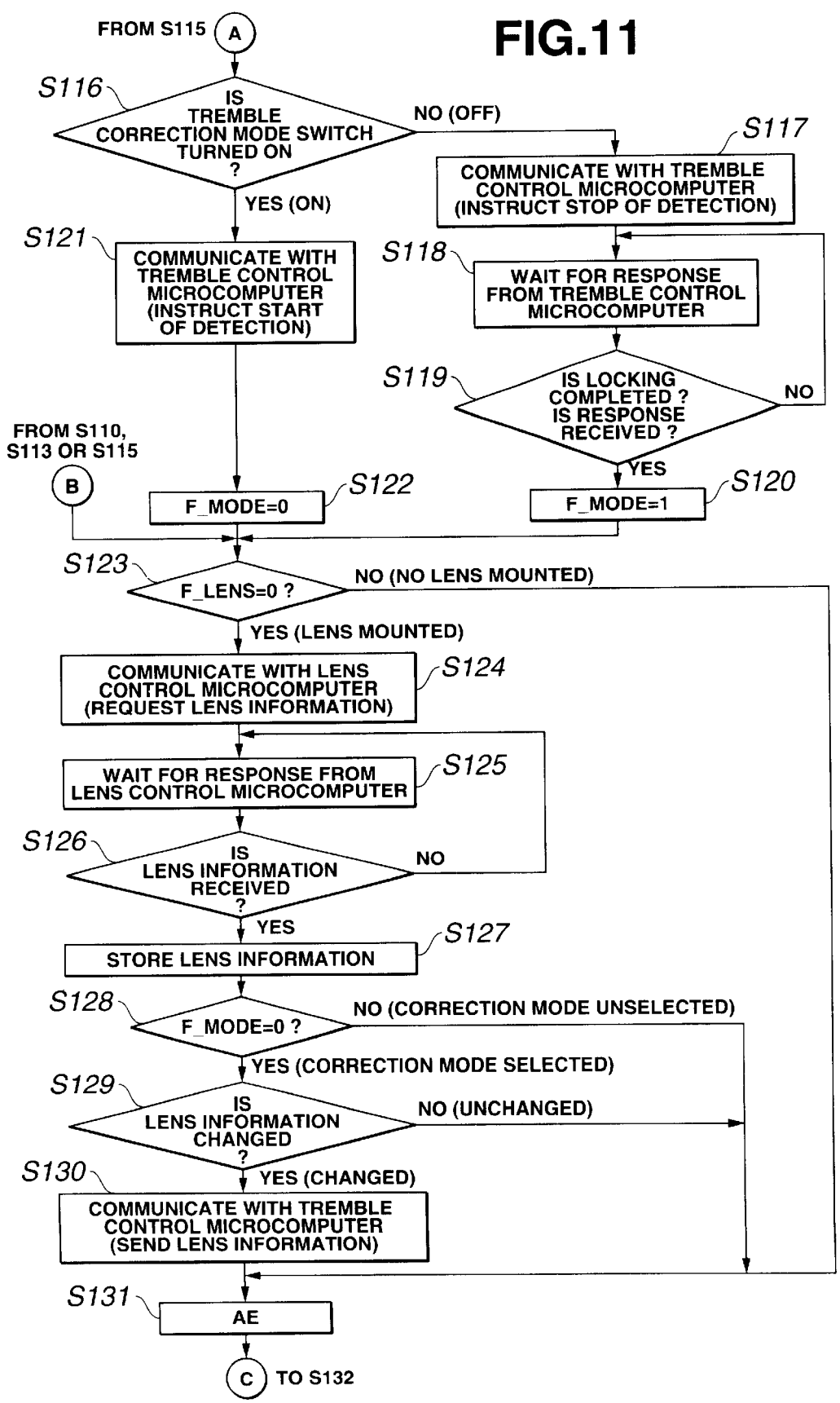
FIG. 11 is a flowchart describing control actions to be performed by the camera control microcomputer incorporated in the camera in accordance with the present invention.

Referring to FIG. 11, it is judged at step S116 whether the tremble correction mode switch is turned on. If it is judged at step S116 that the tremble correction mode switch is turned off, the camera control microcomputer communicates with and instructs the tremble control microcomputer 11 to suspend tremble detection and correction at step S117. At step S118, the camera control microcomputer waits until the tremble control microcomputer 11 drives the correction optical member lock member 16 so as to lock the tremble correction optical member 14 and to suspend tremble detection and correction. It is judged at step S119 whether a response saying that tremble detection and correction has been suspended is received from the tremble control microcomputer 11. If the response saying that tremble detection and correction has been suspended is not received, control is returned to step S118. If the response saying that the tremble correction optical member 14 has been locked and that tremble detection and correction has been suspended is received, the flag F_MODE is set to 1 at step S120 in order to indicate that the tremble correction mode is unselected. Thereafter, step S123 and subsequent steps are carried out.

Since the tremble control microcomputer 11 is instructed at step S117 to suspend tremble detection and correction and to lock the tremble correction optical member 14, tremble correction unnecessarily executed although the tremble correction mode is not selected is suspended. Eventually, the tremble detection/correction block is prevented from consuming power unnecessarily.

If it is judged at step S116 that the tremble correction mode switch is turned on, the tremble control microcomputer 11 is instructed to start tremble detection and correction through communication at step S121. At step S122, the flag F_MODE is reset to 0 in order to indicate that the tremble correction mode has been selected.

At step S123, it is judged whether the flag F_LENS is reset to 0 in order to indicate that a taking lens 2 has been mounted on the lens mount 8. If it is judged that the flag F_LENS is set to 1 in order to indicate that no taking lens 2 is mounted, step S131 and subsequent steps are carried out. If it is judged that the flag F_LENS is reset to 0 in order to indicate that the taking lens 2 has been mounted, the camera control microcomputer communicates with the lens control microcomputer 41 at step S124 so as to request for a focal length currently exhibited by the taking lens 2. The camera control microcomputer waits for a response returned from the lens control microcomputer 41 at step S125. It is judged at step S126 whether the focal length is received from the lens control microcomputer 41. If the focal length is not received, control is returned to step S125. If it is judged that the focal length has been received, that is, lens information has been returned, the focal length received from the lens control microcomputer 41 is stored in a memory included in the camera control microcomputer 21. The focal length is used to determine a condition for exposure according to the result of photometry or used to calculate the degree of a tremble in an image derived from a hand tremble by the tremble control microcomputer 11.

At step S128, it is judged whether the flag F_MODE indicating whether the tremble correction mode is selected is reset to 0. If the flag F_MODE is reset to 0 in order to indicate that the tremble correction mode has been selected, it is judged at step S129 whether the focal length stored in the camera control microcomputer 21 at step S127 is different from a previously stored focal length. If there is a difference between the previously stored focal length and the focal length stored at step S127, the camera control microcomputer 21 communicates with the tremble control microcomputer 11 to transfer the focal length newly fetched at step S127 to the tremble control microcomputer 11. Step S131 and subsequent steps are then carried out. If it is judged at step S128 that the flag F_MODE is set to 1 in order to indicate that the tremble correction mode is unselected, or if it is judged at step S129 that the focal length transferred from the lens control microcomputer 41 and stored at step S127 is not different from the previously stored focal length, step S131 and subsequent steps are carried out.

At step S131, a photometry sensor (not shown) is used to perform photometry on light reflected from an object. A shutter speed, an f-number, and other conditions for exposure are then calculated.

Figure 12:
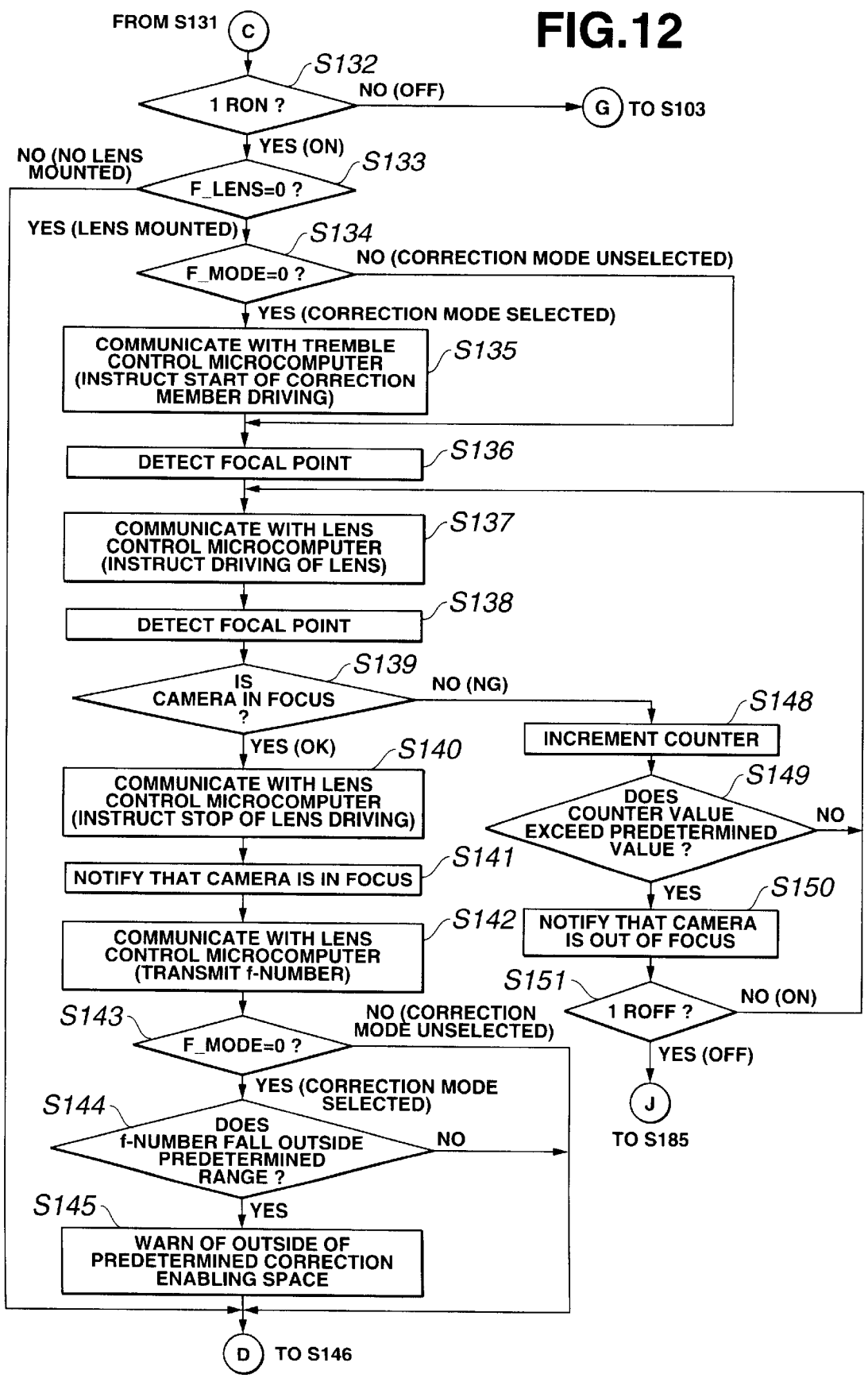
FIG. 12 is a flowchart describing control actions to be performed by the camera control microcomputer incorporated in the camera in accordance with the present invention.

Referring to FIG. 12, it is judged at step S132 whether the preparations-for-photography instructing member (1R) 34 is manipulated in order to instruct preparations for photography, that is, whether a so-called first release switch 1R is turned on. If it is judged that the preparations-for-photography instructing member 34 is turned off, control is returned to step S103. If it is judged that the preparations-for-photography instructing member 34 is turned on, it is judged at step S133 whether the flag F_LENS is reset to 0 in order to indicate that a taking lens 2 has been (properly) mounted. If it is judged that the flag is reset to 0 in order to indicate that the taking lens 2 has been (properly) mounted, step S134 and subsequent steps are carried out. If it is judged that the flag F_LENS is set to 1 in order to indicate that no taking lens is mounted, step S146 and subsequent steps are carried out.

At step S134, it is judged whether the flag F_MODE is reset to 0 in order to indicate that the tremble correction mode has been selected from among various photography modes. If the flag F_MODE is set to 1 in order to indicate that the tremble correction mode is unselected, step S136 and subsequent steps are carried out. If it is judged that the flag F_MODE is reset to 0, since the tremble correction mode has been selected and it has been instructed to make preparations for photography, the camera control microcomputer communicates with the tremble control microcomputer 11 at step S135, and instructs the tremble control microcomputer 11 to start driving the tremble correction optical member.

At step S136, a focal point detection sensor (not shown) is used to detect and calculate a focal point. Based on the result of focal point detection, the lens control microcomputer 41 is instructed to drive the focusing lens 42 for the purpose of focusing the camera at step S137. At step S138, focal point detection is resumed. After the focal point detection is performed again at step S138, it is judged at step S139 whether the camera is brought into focus by driving the focusing lens 42. If the camera is in focus, step S140 and subsequent steps are carried out. If the camera is out of focus, step S148 and subsequent steps are carried out.

At step S140, the camera control microcomputer communicates with the lens control microcomputer 41 and instructs the lens control microcomputer 41 to stop driving the focusing lens 42 because the camera is in focus. At step S141, the state-of-camera notifying unit 37 is used to notify that the camera is in focus.

At step S142, the camera control microcomputer communicates with the lens control microcomputer 41 to transfer an f-number. It is judged at step S143 whether the flag F_MODE is reset to 0 in order to indicate that the tremble correction mode has been selected from among the photography modes. If it is judged that the flag F_MODE is set to 1 in order to indicate that the tremble correction mode is unselected, step S146 and subsequent steps are carried out. If it is judged that the flag F_MODE is reset to 0 in order to indicate that the tremble correction mode has been selected, it is judged at step S144 whether a currently exhibited focal length falls within a predetermined range.

A permissible space in which the tremble correction optical member 14 is permitted to move in order to correct a hand tremble, that is, a correction enabling space is limited. If a focal length is judged to be large, the tremble correction optical member 14 may traverse the correction enabling space. If the tremble correction optical member 14 lies near the border of the correction enabling space that permits accurate correction, correction may not be achieved successfully. This is true especially when photography is performed at a low shutter speed. Moreover, when the focal length is small, no problem may occur in terms of the correction enabling space. However, if a magnitude of drive by which the tremble correction optical member 14 is driven to move for correction, a portion of an image unaffected by a hand tremble that should be corrected may deteriorate terribly.

In the camera in accordance with the present invention, the movement of the tremble correction optical member is restricted in the foregoing case. In practice, the tremble control microcomputer 11 controls the movement of the tremble correction optical member. If it is found as a result of judgment made at step S144 that the tremble correction optical member lies outside the predetermined correction enabling space, the state-of-camera notifying unit 37 is used to give a notification (warning) at step S145. If the tremble correction optical member lies within the predetermined space, step S146 and subsequent steps are carried out.

If it is judged at step S139 that the camera is not brought into focus by driving the focusing lens 42, a value indicated by a counter included in the camera control microcomputer 21 is incremented at step S148. This is intended to give a warning when the number of times by which the camera is detected to be out of focus reaches a predetermined number of times (a predetermined time). The counter is initialized at any time prior to step S137. It is then judged at step S149 whether the counter value is equal to or larger than a predetermined value. In other words, it is judged whether a predetermined time has elapsed since the camera went out of focus. If the predetermined time has not elapsed, control is returned to step S137. If the predetermined time or a longer time has elapsed, the state-of-camera notifying unit 37 is used to notify at step S150 that the camera is out of focus. It is judged at step S151 whether the preparations-for-photography instructing member 34 is turned on, control is returned to step S137. If it is judged that the preparations-for-photography instructing member 34 is turned off, step S185 and subsequent steps are carried out.

Figure 13:
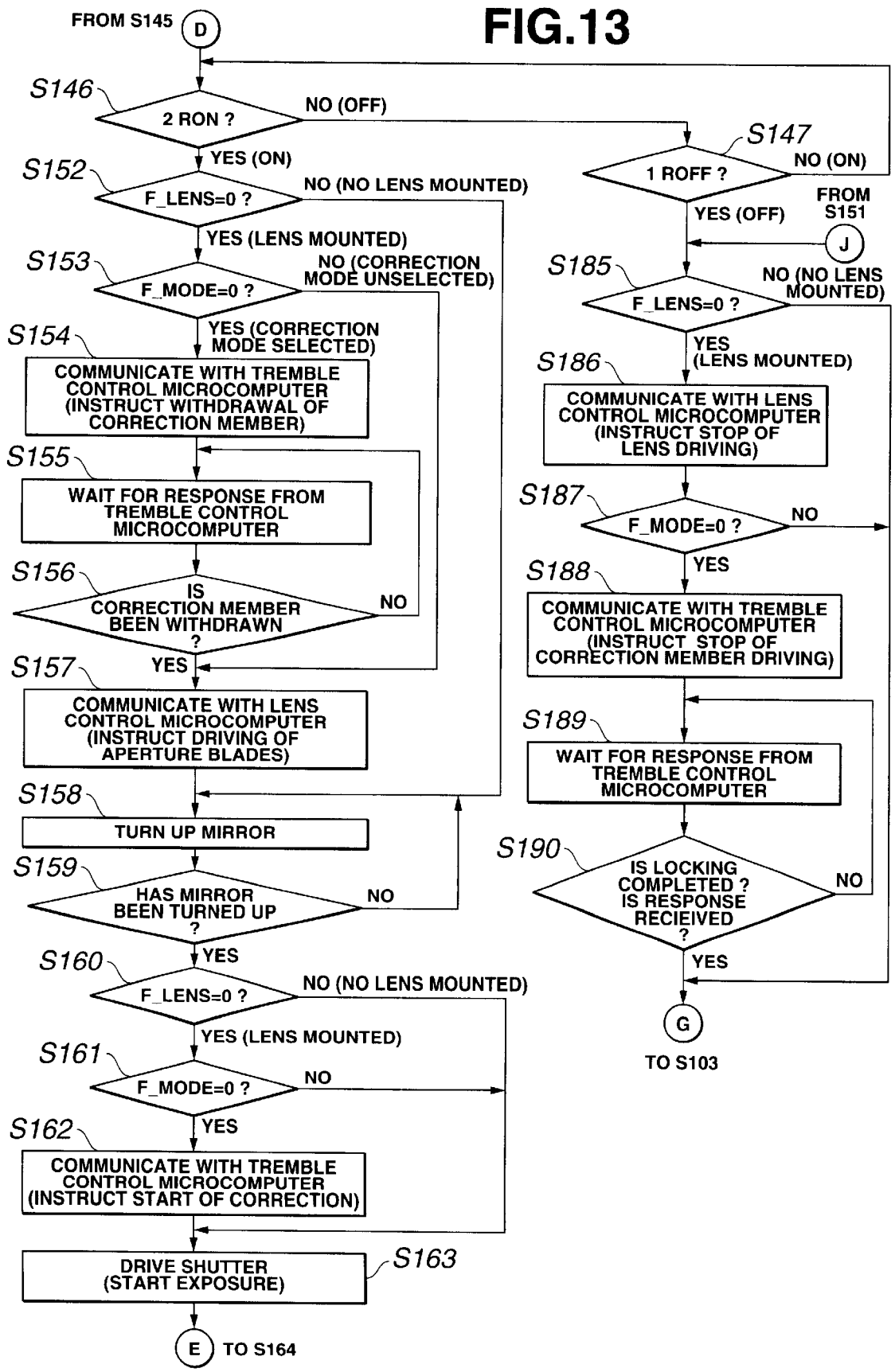
FIG. 13 is a flowchart describing control actions to be performed by the camera control microcomputer incorporated in the camera in accordance with the present invention.

Referring to FIG. 13, it is judged at step S146 whether the start-of-photography instructing member (2R) 35 is used to instruct start of photography. If the start-of-photography instructing member (2R) 35 is used to instruct start of photography (the start-of-photography instructing member is turned on (2RON)), step S152 and subsequent steps are carried out. If start of photography is not instructed (the start-of-photography instructing member is turned off (2ROFF)), it is judged at step S147 whether the preparations-for-photography instructing member (1R) 34 is not used to instruct preparations for photography (whether the preparations-for-photography instructing member (1R) 34 is turned off). If it is judged that the preparations-for-photography instructing member 34 is turned on (1RON), control is returned to step S146. If it is judged that the preparations-for-photography instructing member 34 is turned off (1ROFF) or it is judged at step S151 that the preparations-for-photography instructing member 34 is turned off (1ROFF), it is judged at step S185 whether the flag F_LENS indicating whether a taking lens 2 is mounted on the lens mount 8 is set or reset. If the flag F_LENS is set to 1 in order to indicate that no taking lens 2 is mounted, control is returned to step S103, control is returned to step S103. If it is judged that the flag F_LENS is reset to 0 in order to indicate that a taking lens 2 has been mounted, it is recognized that the instruction that preparations should be made for photography has been canceled. At step S186, the camera control microcomputer communicates with the lens control microcomputer 41 and instructs the lens control microcomputer 41 to stop driving the focusing lens 42. It is judged at step S187 whether the flag F_MODE indicating whether the tremble correction mode is selected is reset to 0. If it is judged that the flag F_MODE is set to 1 in order to indicate that the tremble correction mode is unselected, control is returned to step S103. If it is judged that the flag F_MODE is reset to 0 in order to indicate that the tremble correction mode has been selected, it is recognized at step S188 that the instruction that preparations should be made for photography has been canceled, the camera control microcomputer communicates the tremble control microcomputer 11 and instructs the tremble control microcomputer 11 to stop driving the tremble correction optical member 14. At step S189, the camera control microcomputer waits for a response returned from the tremble control microcomputer 11 and saying that driving of the tremble correction optical member 14 for the purpose of tremble correction has been stopped. At step S190, it is judged whether a response saying that driving of the tremble correction optical member 14 for tremble correction has been stopped is received from the tremble control microcomputer 11. If no response is received, control is returned to step S189. If the response has been received, control is returned to step S103.

If it is judged at step S146 that the start-of-photography instructing member (2R) 35 is turned on, it is judged at step S152 whether the flag F_LENS indicating whether the taking lens 2 is mounted on the lens mount 8 is set or reset. If the flag F_LENS is set to 1 in order to indicate that the taking lens 2 is unmounted, step S158 and subsequent steps are carried out. If the flag F_LENS is reset to 0 in order to indicate that the taking lens 2 has been mounted on the lens mount 8, it is judged at step S153 whether the flag F_MODE indicating whether the tremble correction mode is selected is reset to 0. If the flag F_MODE is set to 1 in order to indicate that the tremble correction mode is unselected, step S157 and subsequent steps are carried out. If it is judged that the flag F_MODE is reset to 0 in order to indicate that the tremble correction mode has been selected, the camera control microcomputer communicates with the tremble control microcomputer 11. The camera control microcomputer then instructs the tremble control microcomputer 11 to withdraw the tremble correction optical member 14 to the predetermined space or requests the tremble control microcomputer 11 to check if the tremble correction optical member is moved within the predetermined space. This is because the quick return mirror 22 must be moved to pivot upwards so as to start exposure.

In the camera in accordance with the present invention, the tremble correction optical member 14 is interposed between the lens mount 8 and quick return mirror 22. This arrangement of the tremble correction optical member, lens mount, and quick return mirror leads to an increase in a distance from the lens mount 8 to the film 27 (flange-focal distance), and eventually to an increase in the size of the camera. For preventing the increase in the size of the camera, it is necessary to shorten the distance from the lens mount 8 to the tremble correction optical member 14 or quick return mirror 22. In other words, the lens mount 8 should be located adjacent to the tremble correction optical member 14 and quick return mirror 22 respectively. However, in this case, the tremble correction optical member 14 comes into contact with the lens mount 8 or quick return mirror 22 when moved in order to correct a hand tremble. The tremble correction optical member 14 cannot therefore be moved on a stable basis. At worst, any part of the quick return mirror 22 may be broken when brought into contact with the tremble correction optical member 14. Eventually, photography may not be able to be achieved. Therefore, in the camera in accordance with the present invention, when the quick return mirror 22 must be moved, the tremble correction optical member 14 is moved within a space in which it will not come into contact with the lens mount 8 or the quick return mirror 22. The tremble correction optical member 14 may not always be withdrawn to a certain position. Instead, as long as the tremble correction optical member 14 will not obstruct the movement (upward or downward pivoting) of the quick return mirror 22, the tremble correction optical member 14 may be kept moved. If the tremble correction optical member 14 may obstruct the movement of the quick return mirror 22, the tremble correction optical member 14 may be withdrawn to a predetermined position. Thus, occurrence of a time lag can be avoided.

At step S154, the camera control microcomputer communicates with the tremble control microcomputer 11. At step S155, the camera control microcomputer waits for a response saying that the tremble correction optical member 14 has been driven to withdraw into a predetermined space. At step S156, it is judged whether a response saying that the tremble correction optical member 14 has been moved within the predetermined space or withdrawn into the predetermined space is received. If the response saying that the tremble correction optical member 14 has been moved within the predetermined space or withdrawn into the predetermined space is not received, control is returned to step S155. If the response saying that the tremble correction optical member 14 has been moved within the predetermined space or withdrawn into the predetermined space has been received, the camera control microcomputer instructs the lens control microcomputer 41 to drive the aperture blades 45 so that the aperture blades 45 will be closed to a level which provides a predetermined f-number. This instruction that the aperture blades 45 should be closed may be issued among steps S153 to S156.

Thereafter, at step S158, the mirror driver 23 is driven so that the quick return mirror 22 will pivot upwards. At step S159, it is judged from the result of detection performed by the state-of-mirror detector 24 whether the upward pivoting of the quick return mirror 22 is completed. If it is judged that the upward pivoting of the quick return mirror 22 is not completed, control is returned to step S158; otherwise control continues to step S160. It is judged at step S160 whether the flag F_LENS indicating whether a taking lens 2 is mounted is set or reset. If it is judged that the flag F_LENS is set to 1 in order to indicate that no taking lens 2 is mounted, step S163 and subsequent steps are carried out. If it is judged that the flag F_LENS is reset to 0 in order to indicate that a taking lens 2 has been mounted, it is judged at step S161 whether the tremble correction mode is selected. If it is judged that the flag F_MODE is set to 1 in order to indicate that the tremble correction mode is unselected, step S163 and subsequent steps are carried out. If it is judged that the flag F_MODE is reset to 0 in order to indicate that the tremble correction mode has been selected, since it is judged at step S159 that the upward pivoting of the quick return mirror 22 is completed, the camera control microcomputer instructs the tremble control microcomputer 11 to restore or restart ordinary correction at step S162. This is because the withdrawal of the tremble correction optical member 14 for correction is restricted at step S154. At step S163, the shutter driver 26 is driven in order to drive the shutter 25 and start exposure of the film 27 to light reflected from an object.

Figure 14:
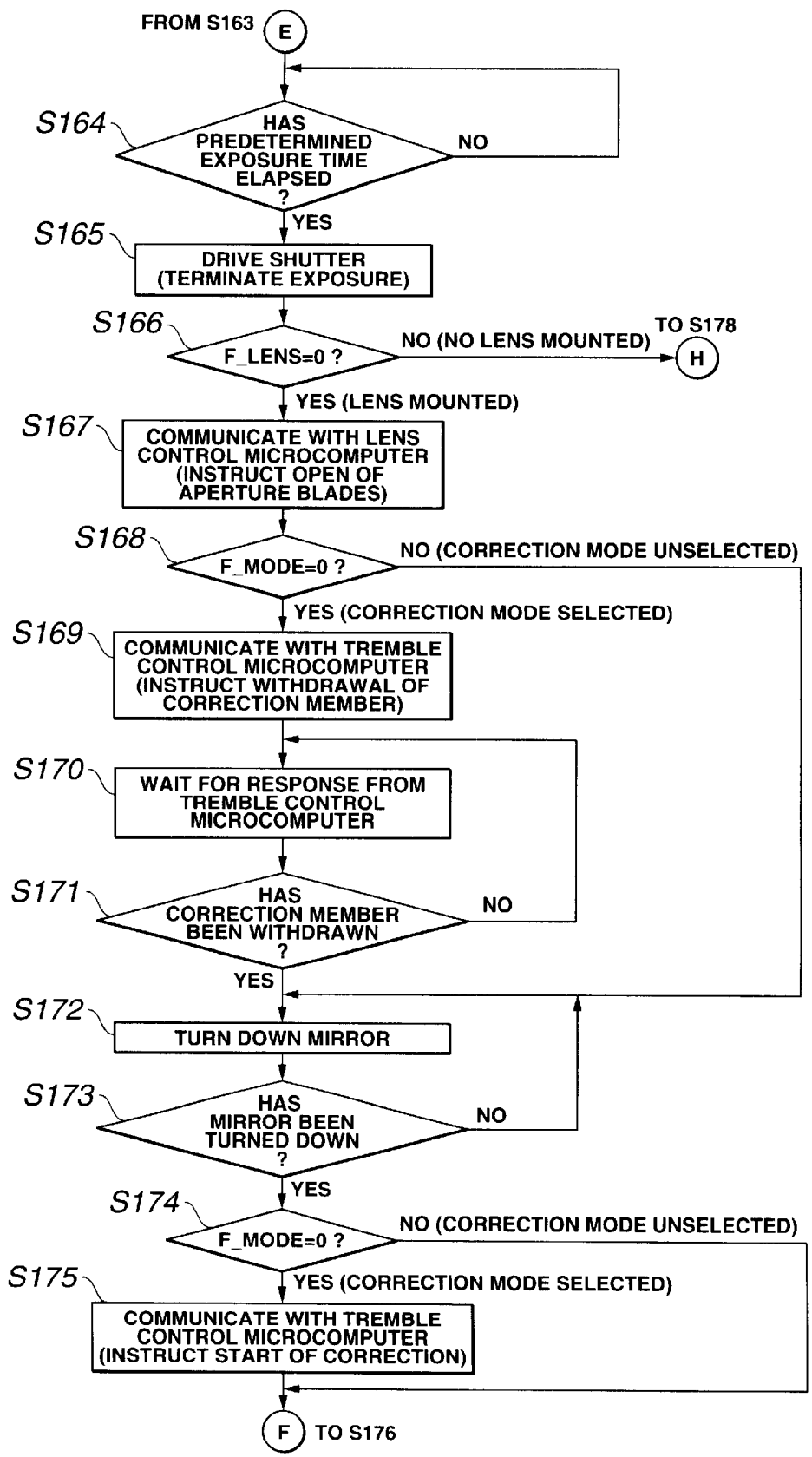
FIG. 14 is a flowchart describing control actions to be performed by the camera control microcomputer incorporated in the camera in accordance with the present invention.

Referring to FIG. 14, it is judged at step S164 whether a predetermined exposure time has elapsed. If the predetermined exposure time has not elapsed, it is judged again whether the predetermined exposure time has elapsed. If it is judged that the predetermined exposure time has elapsed, driving the shudder driver 26 is terminated in order to stop driving the shutter 25 at step S165. Exposure is thus terminated.

Thereafter, it is judged at step S166 whether the flag F_LENS indicating whether a taking lens 2 is mounted is set or reset. If it is judged that the flag F_LENS is set to 1 in order to indicate that no taking lens 2 is mounted, step S178 and subsequent steps are carried out. If it is judged that the flag F_LENS is reset to 0 in order to indicate that a taking lens 2 has been mounted, the camera control microcomputer instructs the lens control microcomputer 41 to drive and open the aperture blades 45 at step S167 because exposure is terminated. It is judged at step S168 whether the flag F_MODE indicating whether the tremble correction mode is selected is set or reset. If it is judged whether the flag F_MODE is set to 1 in order to indicate that the tremble correction mode is unselected, step S172 and subsequent steps are carried out. If the flag F_MODE is reset to 0 in order to indicate that the tremble correction mode has been selected, the camera control microcomputer instructs the tremble control microcomputer 11 to withdraw the tremble correction optical member 14 into the predetermined space at step S169. This is because since exposure is terminated, the quick return mirror 22 is driven to pivot upwards. The reason why the tremble correction optical member 14 is withdrawn into the predetermined space is the same as that described in relation to step S154.

At step S170, the camera control microcomputer waits for a response to the instruction given at step S169 which will be returned from the tremble control microcomputer 11. It is judged at step S171 whether a response saying that the tremble correction optical member 14 is withdrawn into the predetermined space or moved within the predetermined space is received. If it is found that the tremble correction optical member 14 is not moved within or withdrawn into the predetermined space, control is returned to step S170. If it is found that the tremble correction optical member 14 is moved within or withdrawn into the predetermined space, the mirror driver 23 is driven at step S172 so that the quick return mirror 22 will pivot downwards. The state-of-mirror detector 24 detects at step S173 whether or not the quick return mirror 22 has been driven to pivot downwards. If the downward pivoting of the quick return mirror 22 is not completed, control is returned to step S172. If it is found that the downward pivoting of the quick return mirror 22 is completed, it is judged at step S174 whether the flag F_MODE indicating whether the tremble correction mode is selected is set or reset. If the flag F_MODE is set to 1 in order to indicate that the tremble correction mode is unselected, step S176 and subsequent steps are carried out. If it is judged that the flag F_MODE is reset to 0 in order to indicate that the tremble correction mode has been selected, since the downward pivoting of the quick return mirror is completed, the camera control microcomputer communicates with the tremble control microcomputer 11 at step S175. The camera control microcomputer instructs the tremble control microcomputer 11 to lift the restrictions imposed on the movement of the tremble correction optical member so that ordinary tremble correction will be restarted.

Figure 15:
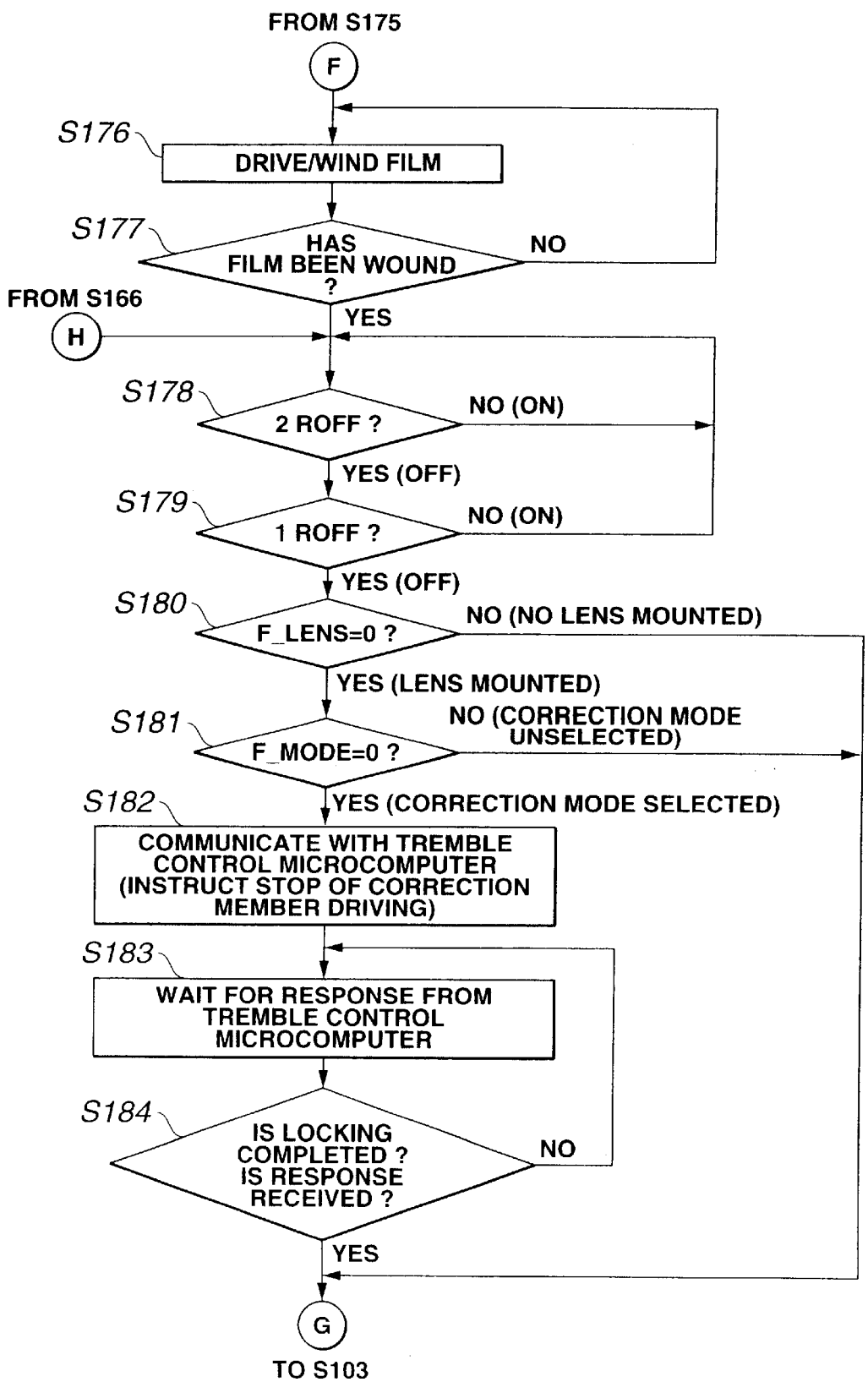
FIG. 15 is a flowchart describing control actions to be performed by the camera control microcomputer incorporated in the camera in accordance with the present invention.

Referring to FIG. 15, since exposure is terminated, the film driver 28 drives the film 27 to wind it at step S176. It is judged at step S177 whether winding the film 27 is completed. This judgment is made based on an output of the state-of-film detector 29. If winding the film 27 is uncompleted, control is returned to step S176. If winding the film 27 is completed, since exposure is terminated, it is judged at step S178 whether the instruction that photography should be started is canceled using the start-of-photography instructing member (2R) 35. If the start-of-photography instructing member 35 is on, the judgment is repeated. If it is judged that the start-of-photography instructing member 35 is off (2ROFF), it is judged at step S179 whether the instruction that preparations should be made for photography is canceled using the preparations-for-photography instructing member (1R) 34. If the preparations-for-photography instructing member 34 is on, step S178 and step S179 are repeated. If it is judged that the preparations-for-photography instructing member 34 is off (1ROFF), it is judged at step S180 whether the flag F_LENS indicating whether a taking lens 2 is mounted is set or reset. If it is judged that the F_LENS is set to 1 to indicate that no taking lens 2 is mounted, control is returned to step S103. If it is judged that the flag F_LENS is reset to 0 in order to indicate that a taking lens 2 is mounted, control advances to step S180. If it is judged that the F_Mode is reset to 1, in order to indicate that the tremble correction mode has been unselected, control is returned to step S103. If, on the other hand, if it is judged that the F_Mode is set to 1, in order to indicate that the tremble correction mode has been selected, since the instruction that preparations should be made for photograph (1ROFF) is canceled, the camera control microcomputer communicates with the tremble control microcomputer 11 at step S182. The camera control microcomputer instructs the tremble control microcomputer 11 to stop driving the tremble correction optical member 14 for the purpose of correction. This is because since the instruction that preparations should be made for photography is canceled, the tremble correction optical member 14 must be locked at a predetermined position. Thus, consumption of unnecessary power can be prevented.

Thereafter, at step S183, the camera control microcomputer waits for a response to the instruction that driving the tremble correction optical member 14 for correction should be stopped which will be returned from the tremble control microcomputer 11. It is judged at step S184 whether a response saying that the tremble correction optical member for correction is locked is received from the tremble control microcomputer 11. If the response saying that the tremble correction optical member for correction is locked is not received, control is returned to step S183. If the response saying that the tremble correction optical member for correction is locked is received, control is returned to step S103.

Figure 16:
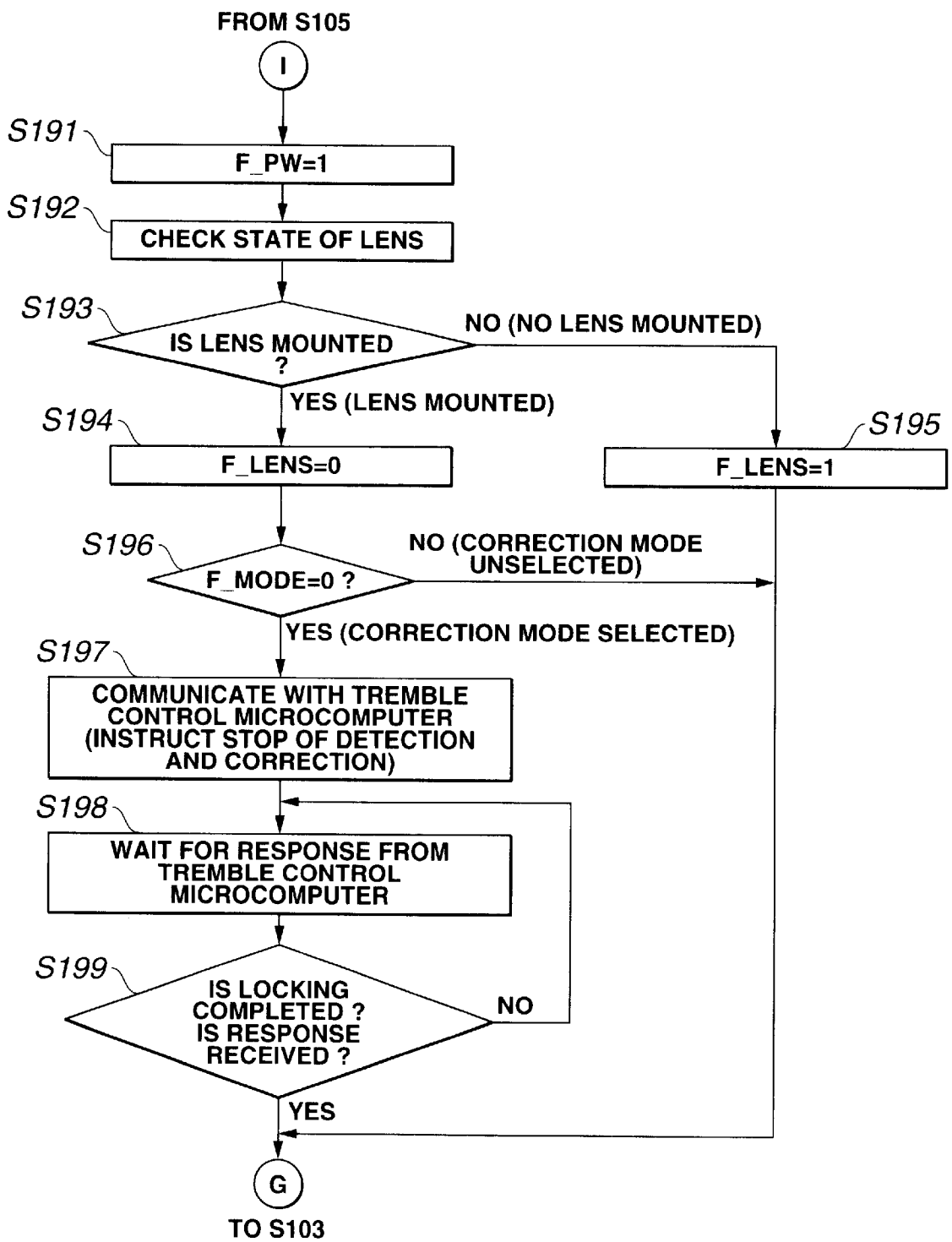
FIG. 16 is a flowchart describing control actions to be performed by the camera control microcomputer incorporated in the camera in accordance with the present invention.

Referring to FIG. 16, if it is found at step S105 (see FIG. 10) that the camera power switch 36 is turned off, the flag F_PW indicating the state of the camera power switch 36 is set to 1 at step S191. It is checked at step S192 if the taking lens 2 is mounted on the lens mount 8. It is judged at step S193 whether the taking lens 2 is mounted. If it is judged that no taking lens is mounted, the flag F_LENS is set to 1 at step S195 in order to indicate that no taking lens 2 is mounted. Control is then returned to step S103. If it is judged that a taking lens 2 has been mounted, the flag F_LENS is reset to 0 at step S194 in order to indicate that the taking lens 2 has been mounted.

It is judged from the flag, which indicates whether the tremble correction mode is selected, at step S196 whether the photography mode setting unit 33 has recognized that the tremble correction mode has been selected. If the tremble correction mode flag F_MODE is set to 1, it is judged that the tremble correction mode is unselected. Control is then returned to step S103. If the tremble correction mode flag F_MODE is reset to 0, it is judged that the tremble correction mode is selected and control proceeds to step S197. At step S197, the camera control microcomputer instructs the tremble control microcomputer 11 to suspend tremble detection performed by the tremble detection/correction block and to lock the tremble correction optical member 14.

Tremble detection is suspended and the tremble correction optical member 14 is locked. However, when the power supply of the camera is turned off, the taking lens 2 can be dismounted from the lens mount 8 at any time. Moreover, when the power supply is turned off, it cannot be detected whether the taking lens 2 is mounted. When or after a user dismounts the taking lens 2 from the lens mount 8, the user may touch the tremble correction optical member 14 by mistake. In this case, if the tremble correction optical member 14 is movable, it may be broken. The tremble correction optical member 14 is locked in order to prevent it from being broken.

Thereafter, at step S198, the camera control microcomputer waits for a response, which says that suspending tremble detection is completed and locking the tremble correction optical member 14 is completed, returned from the tremble control microcomputer 11. It is judged at step S199 whether the response saying that locking is completed is received from the tremble control microcomputer 11. If the response is not received, control is returned to step S198. If the response has been received, control is returned to step S103.

Next, control actions to be performed by the tremble control microcomputer 11 will be described in conjunction with FIG. 17 to FIG. 21.

Figure 17:
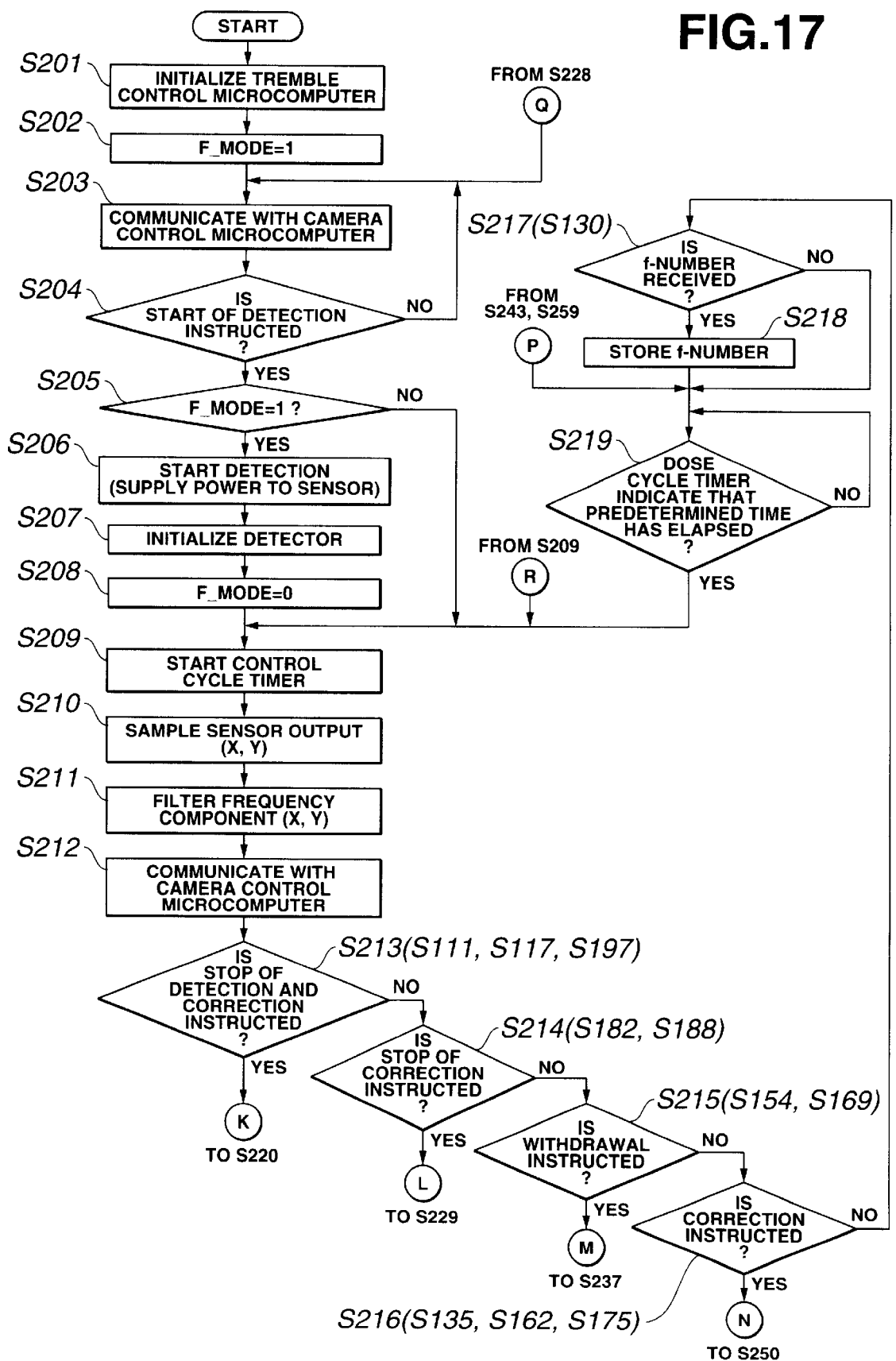
FIG. 17 is a flowchart describing control microcomputer incorporated in the camera in accordance with the present invention.

Referring to FIG. 17, at step S201, the tremble control microcomputer 11 is initialized. At step S202, the flag F_MODE indicating whether the tremble correction mode is selected and recognized by the photography mode setting unit 33 is initialized. When the tremble correction mode is unselected, the flag F_MODE is set to 1. When the tremble correction mode is selected, the flag F_MODE is reset to 0. At step S202 of initialization, the F_MODE is set to 1.

Thereafter, at step S203, the tremble control microcomputer communicates with the camera control microcomputer 21. At step S204, it is judged whether start of tremble detection is instructed by the camera control microcomputer 21. If it is judged that start of tremble detection is not instructed by the camera control microcomputer 21, control is returned to step S203. If it is judged that start of tremble detection has been instructed, step S205 and subsequent steps are carried out. The instruction that tremble detection should be started is communicated to the tremble control microcomputer 11 at step S121 described as an action of the camera control microcomputer 21 in FIG. 11.

Thereafter, at step S205, it is judged whether the tremble correction mode flag F_MODE indicating whether the tremble correction mode is selected is set to 1. If the tremble correction mode flag F_MODE is reset to 0 in order to indicate that the tremble correction mode has been selected, step S209 and subsequent steps are carried out. If the tremble correction mode flag F_MODE is set to 1 in order to indicate that the tremble correction mode is unselected, since start of tremble correction has been instructed, the tremble detection sensor (X) 12X and tremble detection sensor (Y) 12Y are powered at step S206 in order to start tremble detection. The tremble detection sensors 12X and 12Y are initialized detection-related parameters (initial values and constants are set to certain values) are initialized so that a hand tremble detection can be continuously detected based on the outputs of the tremble detection sensors 12X and 12Y. At step S208, the flag F_MODE is reset to 0 in order to indicate that the tremble correction mode has been selected.

Thereafter, at step S209, a control cycle timer is activated in order to control tremble detection and correction at intervals of a certain cycle. This is because tremble detection and correction should be controlled at intervals of a certain cycle in order to accurately detect a constantly varying hand tremble and accurately correct a tremble in an image derived from the hand tremble. Herein, one cycle time is, for example, one millisecond.

Thereafter, at step S210, the tremble control microcomputer 11 samples the output signals of the tremble detection sensor (X) 12X and tremble detection sensor (Y) 12Y respectively. More particularly, an analog signal representing a tremble detected by the tremble detection sensor (X or Y) 12X or 12Y is digitized, and the resultant digital tremble signal is sampled. Noted is that tremble detection and correction is achieved by using the same sample to correct a tremble in terms of both the directions of the axis of abscissas (X) and axis of ordinates (Y) in an coordinate system defined on the film 27.

Thereafter, at step S211, frequency components other than a frequency component affected by a hand tremble are removed (filtered) from the tremble signal originating from the tremble detection sensor (X or Y) 12X or 12Y. The removal of the frequency components other than the frequency component affected by a hand tremble is achieved by software installed in the tremble control microcomputer 11.

Thereafter, at step S212, the tremble control microcomputer communicates with the camera control microcomputer 21. At step S213, it is judged whether the contents of communication with the camera control microcomputer 21 are instructions to suspend tremble detection and correction. If it is judged that the instruction issued from the camera control microcomputer 21 is the instruction that tremble detection and correction should be suspended, step S220 and subsequent steps are carried out. If it is judged that the instruction issued from the camera control microcomputer 21 is not the instruction that tremble detection and correction should be suspended, step S214 and subsequent steps are carried out. The instruction that tremble detection and correction should be suspended corresponds to the instruction issued from the camera control microcomputer 21 at step S111 in FIG. 10, step S117 in FIG. 11, or step S197 in FIG. 16.

If it is judged at step S213 that the instruction issued from the camera control microcomputer 21 is not the instruction that tremble detection and correction should be suspended, it is judged whether the instruction issued from the camera control microcomputer 21 at step S212 is the instruction that tremble correction should be suspended. The instruction that tremble correction should be suspended corresponds to the instruction issued from the camera control microcomputer 21 at step 182 in FIG. 15 or step S188 in FIG. 13.

If it is judged at step S214 that the instruction is the instruction that tremble correction should be suspended, step S229 and subsequent steps are carried out. If it is judged that the instruction is not the instruction that tremble correction should be suspended, it is judged at steps S215 whether the contents of communication with the camera control microcomputer 21 at step S212 are instructions to withdrawn the tremble correction optical member for tremble correction. The instruction that the tremble correction optical member should be withdrawn for tremble correction corresponds to the instruction issued from the camera control microcomputer 21 at step S154 in FIG. 13 or step S169 in FIG. 14.

If it is judged at step S215 that the instruction issued from the camera control microcomputer 21 is the instruction that the tremble correction optical member should be withdrawn for tremble correction, step S237 and subsequent steps are carried out. If it is judged that the instruction is not the instruction that the tremble correction optical member should be withdrawn for tremble correction, it is judged at step S216 whether the contents of communication with the camera control microcomputer 21 performed at step S212 are instructions to start tremble correction. The instruction that tremble correction should be started corresponds to the instruction issued from the camera control microcomputer 21 at step S135 in FIG. 12, step S162 in FIG. 13, or step S175 in FIG. 14.

If it is judged at step S216 that the contents of communications are instructions to start tremble correction, step S250 and subsequent steps are carried out. If it is judged that the contents of communications are not instructions to start tremble correction, it is judged at step S217 whether the contents of communication with the camera control microcomputer 21 performed at step S212 are concerned with transmission of a focal length currently exhibited by the taking lens 2. The transmission of the focal length corresponds to step S130 in FIG. 11.

If it is judged at step S217 that the contents of communication are concerned with transmission of the focal length, step S218 and subsequent steps are carried out. If it is judged that the contents of communication are not concerned with transmission of the focal length, step S219 and subsequent steps are carried out. At step S218, the current focal length communicated from the camera control microcomputer 21 is stored. The focal length is used to grasp a tremble in an image derived from a hand tremble and to calculate a target magnitude of tremble correction.

Thereafter, it is judged at step S219 whether the control cycle timer activated at step S209 indicates that a predetermined time has elapsed. If the predetermined time has elapsed, control is returned to step S209. If the predetermined time has not elapsed, it is judged again whether the predetermined time has elapsed. Consequently, detection and correction of a hand tremble is carried out at intervals of a certain cycle. When the tremble correction mode is canceled during the detection and correction or the preparations-for-photography instructing member (1R) 34 is turned off, tremble correction is no longer necessary. In this case, the merit of carrying out detection and correction at intervals of a certain cycle would be appreciated.

Figure 18:
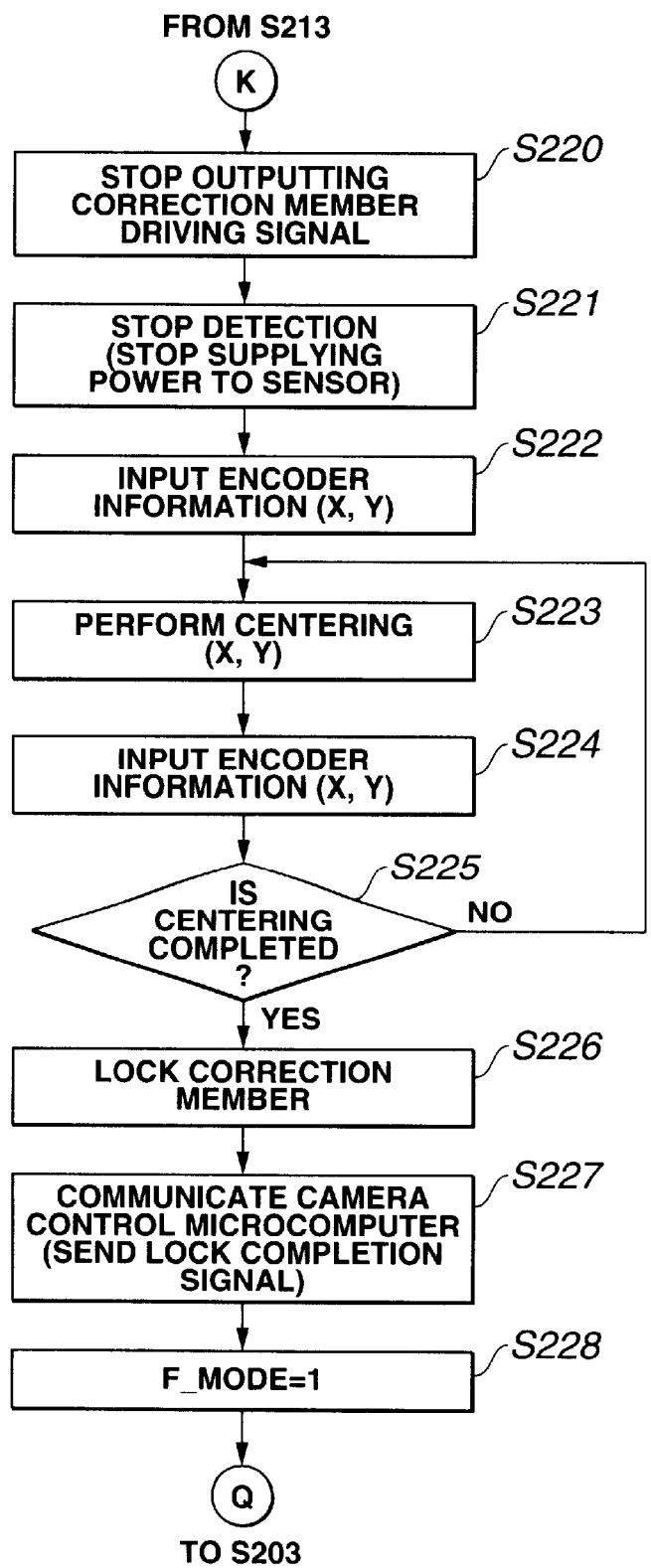
FIG. 18 is a flowchart describing control actions to be performed by the tremble control microcomputer incorporated in the camera in accordance with the present invention.

Referring to FIG. 18, if it is judged at step S213 that the instruction that tremble detection and correction should be suspended has been issued, production of a correction driving signal is stopped at step S220. The correction driving signal is proportional to the degree of a hand tremble detected by the tremble detection sensor (X or Y) 12X or 12Y and produced by the tremble control microcomputer 11 through sampling. At step S221, powering the tremble detection sensor (X) 12X and tremble detection sensor (Y) 12Y is discontinued in order to suspend tremble detection. At step S222, the current position of the tremble correction optical member 14 is checked based on the outputs (changes) of the correction encoder (X) 15X and correction encoder (Y) 15Y. This is because the current position of the tremble correction optical member 14 is needed in order to position the tremble correction optical member 14 in the center of a permissible space later (centering).

Thereafter, at step S223, the correction driving actuator (X) 13X and correction driving actuator (Y) 13Y are driven based on the current position of the tremble correction optical member 14 detected at step S222. Centering is then carried out in order to position the tremble correction optical member 14 in the center of the permissible space. At step S224, the current position of the tremble correction optical member 14 is checked based on the outputs of the correction encoder (X) 15X and correction encoder (Y) 15Y. At step S225, it is judged whether the tremble correction optical member 14 has reached a predetermined position (the center of the permissible space). In other words, it is judged whether centering is completed. If centering is not completed, control is returned to step S223. If it is judged that centering is completed, step S226 and subsequent steps are carried out. Steps S223 to S225 are carried out in relation to the X axis and Y axis respectively.

At step S226, the tremble correction optical member 14 centered in the permissible space at steps S223 to S225 is locked at that position by driving the correction optical member lock member 16. This is intended to prevent the unnecessary movement of the tremble correction optical member 14 during a time interval during which tremble correction is not carried out.

Thereafter, at step S227, the information that suspending tremble detection and correction, which is performed in response to the instruction that tremble detection and correction should be suspended, is completed is transmitted to the camera control microcomputer 21. At step S228, the flag F_MODE indicating whether the tremble correction mode is selected is set to 1 that indicates that the tremble correction mode is unselected. This is because the instruction that tremble detection and correction should be suspended is received from the camera control microcomputer 21. Thereafter, control is returned to step S203.

Figure 19:
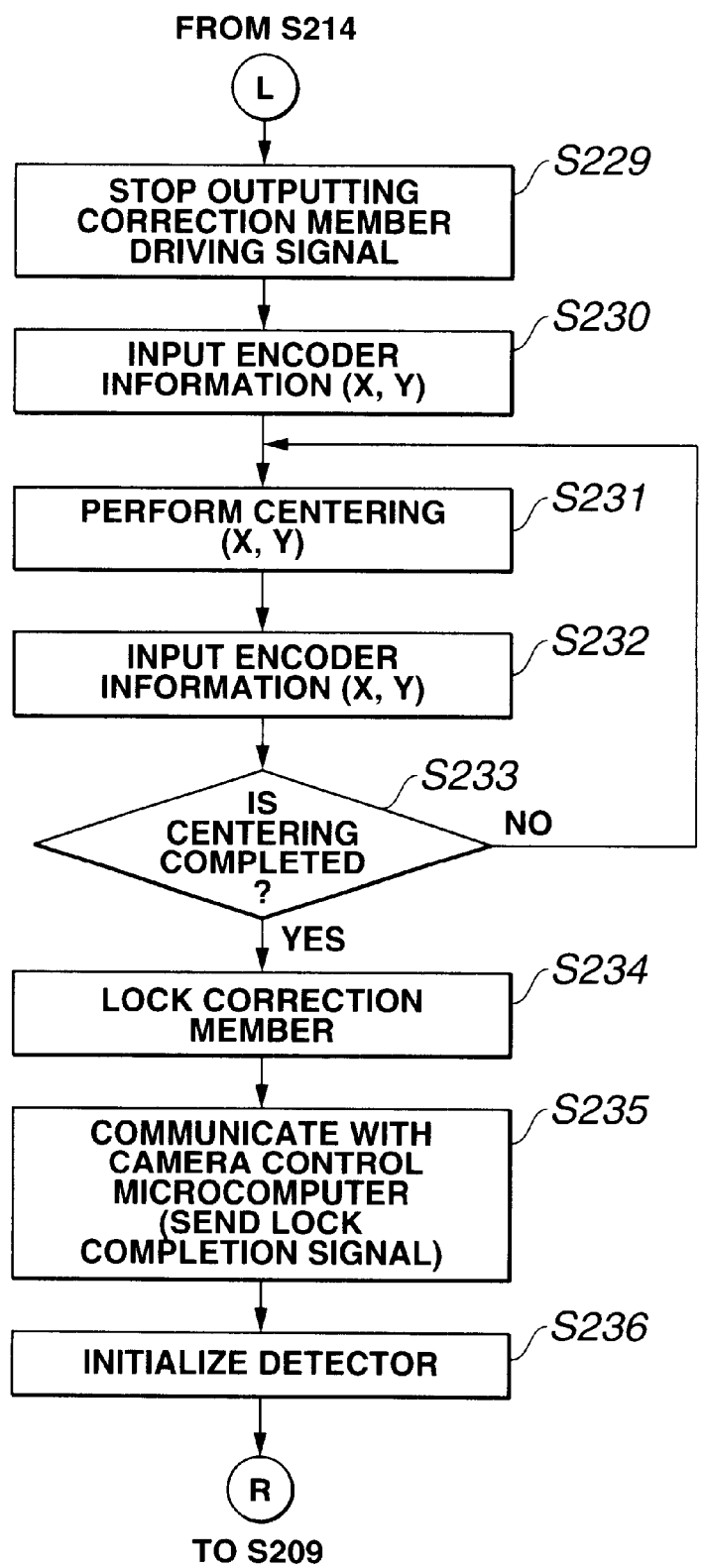
FIG. 19 is a flowchart describing control actions to be performed by the tremble control microcomputer incorporated in the camera in accordance with the present invention.

Referring to FIG. 19, if it is judged at step S214 that the instruction is the instruction that driving the tremble correction optical member should be stopped, production of a tremble correction optical member driving signal whose level is proportional to the degree of a hand tremble is stopped in response to the instruction that driving the tremble correction optical member should be stopped and that is issued at step S212. Specifically, the tremble control microcomputer 11 stops applying a driving control signal to the correction driving actuator (X) 13X and correction driving actuator (Y) 13Y respectively as shown in step S229.

Thereafter, steps S230 to S235 are carried out. The description of these steps will be omitted because step S230 is identical to step S222, step S231 is identical to step S223, step S232 is identical to step S224, step S233 is identical to step S225, step S234 is identical to step S226, and step S235 is identical to step S227.

At step S236, the tremble detection sensor (X) 12X and tremble detection sensor (Y) 12(Y) are initialized (initial values and constants are set to certain values) so that a hand tremble can be continuously detected based on the outputs of the tremble detection sensors (X) 12X and (Y) 12(Y). This is intended to cancel a drift caused by the tremble detection sensor (X) 12X or tremble detection sensor (Y) 12(Y). Thereafter, control is returned to step S203.

Figure 20:
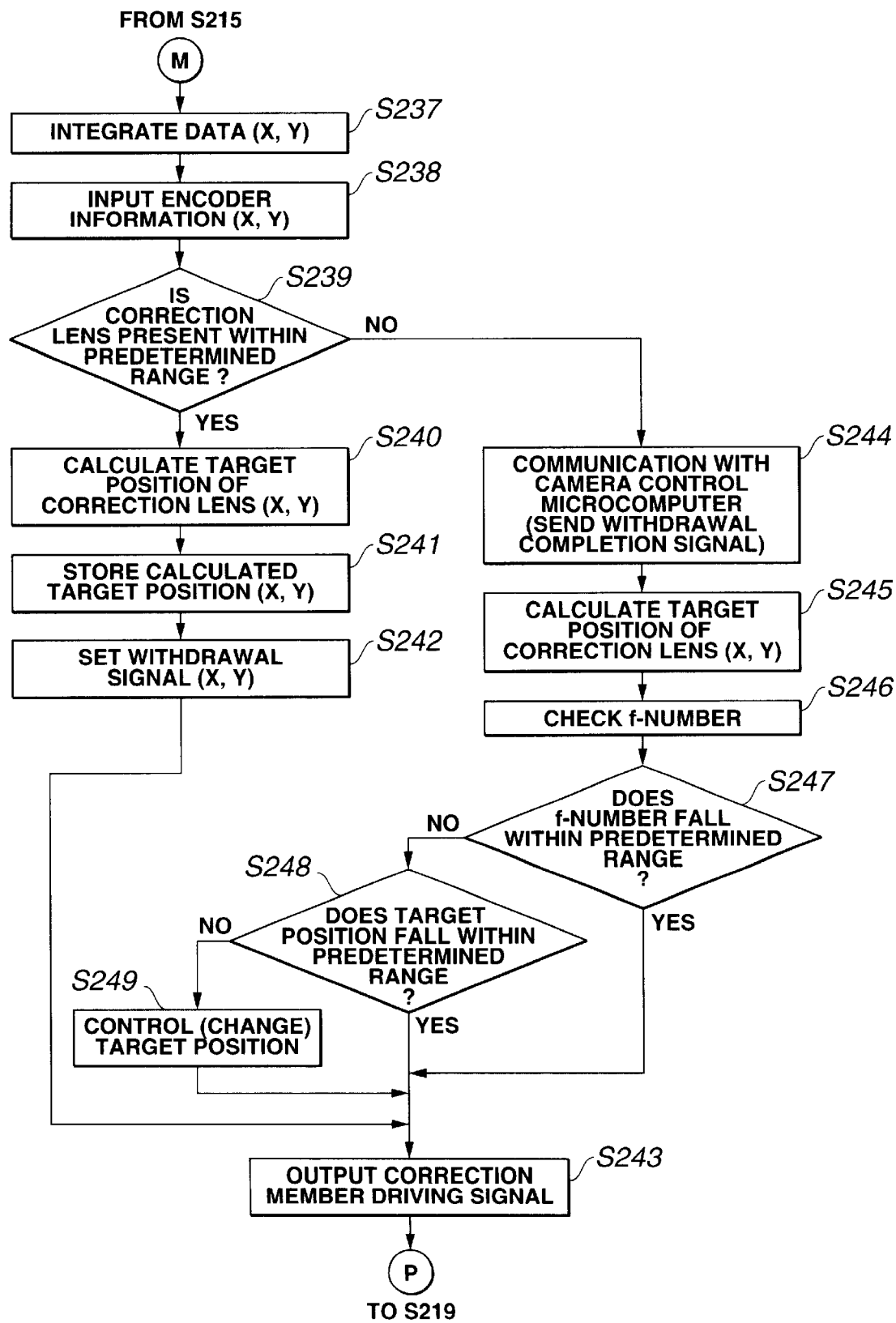
FIG. 20 is a flowchart describing control actions to be performed by the tremble control microcomputer incorporated in the camera in accordance with the present invention.
Figure 21:
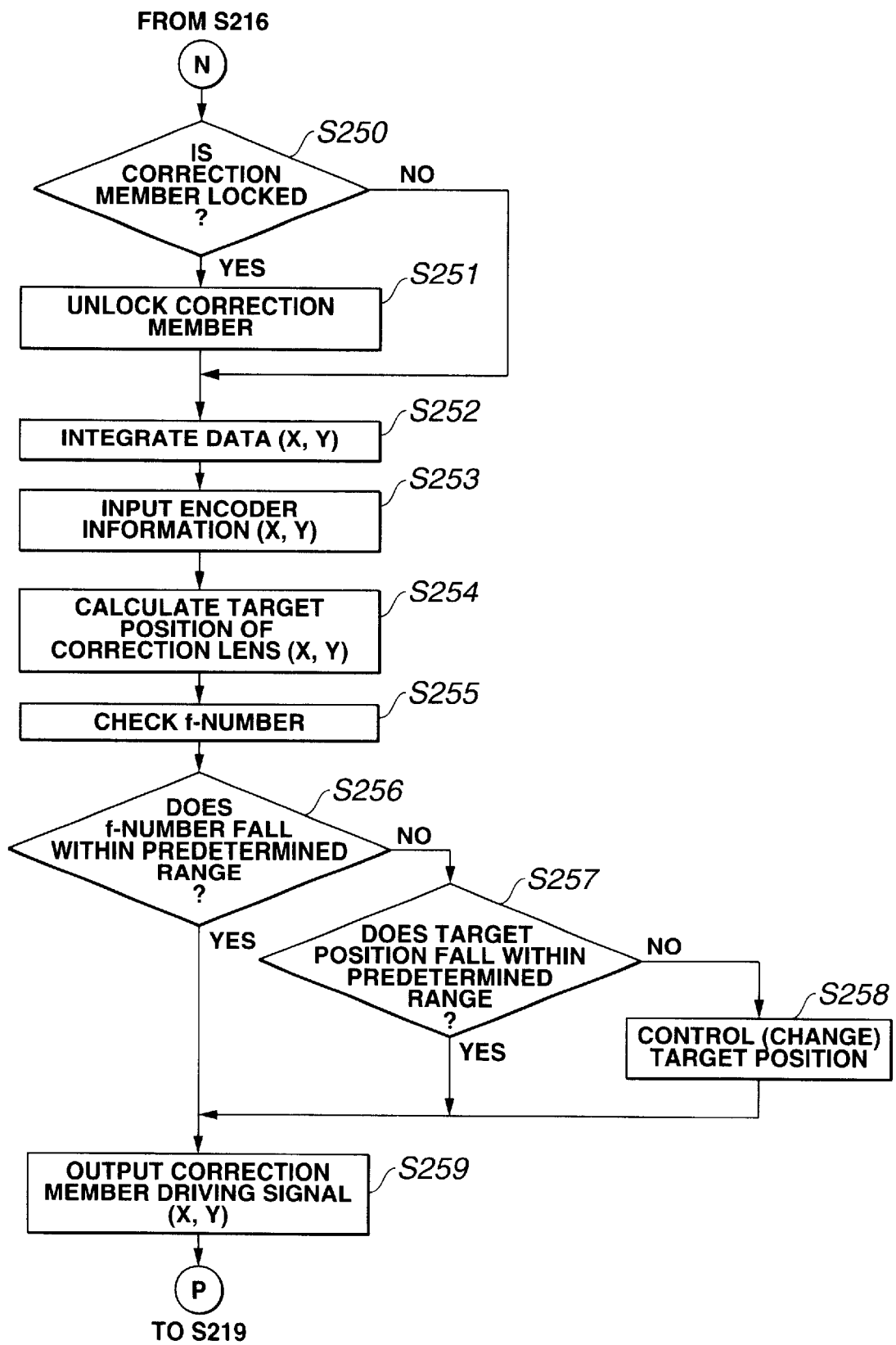
FIG. 21 is a flowchart describing control actions to be performed by the tremble control microcomputer incorporated in the camera in accordance with the present invention.

Referring to FIG. 20, if it is judged at step S215 that instruction issued from the camera control microcomputer 21 is the instruction that the tremble correction optical member should be withdrawn for tremble correction, step S237 and subsequent steps are carried out. Namely, the same processing as the processing performed when the instruction that the tremble correction optical member should be withdrawn is issued from the camera control microcomputer 21 at step S212. Even when the instruction that the tremble correction optical member should be withdrawn has been issued, if the current position of the tremble correction optical member 14 will not obstruct the upward or downward pivoting of the quick return mirror 22, ordinary tremble correction is continued. A target magnitude of tremble correction is calculated based on the result of detection of a hand tremble irrespective of issuance of the instruction that the tremble correction optical member should be withdrawn.

At step S237, an output of the tremble detection sensor (X) 12X or tremble detection sensor (Y) 12Y, that is, current hand tremble information (an angular speed) is integrated in order to calculate a position needed to correct a tremble in an image. At step S238, the current position of the tremble correction optical member 14 is checked based on the (changes in) outputs of the correction encoder (X) 15X and correction encoder (Y) 15Y. The current position of the tremble correction optical member 14 is needed in order to judge whether the tremble correction optical member 14 lies in a space which it will obstruct the movement of the quick return mirror 22 or to perform ordinary tremble correction.

Thereafter, it is judged at step S239 whether the tremble correction optical member 14 lies in a predetermined space in which it will obstruct the movement of the quick return mirror 22. If the tremble correction optical member 14 lies in the predetermined space in which it will obstruct the movement of the quick return mirror 22, step S244 and subsequent steps are carried out. If the tremble correction optical member 14 lies in the space in which it will not obstruct the movement of the quick return mirror 22, a target position to which the tremble correction optical member 14 is driven for the purpose of tremble correction is calculated based on the result of integration performed at step S237, the current position of the tremble correction optical member 14 detected at step S238, and the focal length stored at step S218. Thereafter, the target position for tremble correction calculated at step S240 is stored at step S241. The target position is stored because since the tremble correction optical member 14 must be withdrawn, it cannot be immediately moved to the target position for tremble correction. Since the target position is stored, after withdrawal is completed, the tremble correction optical member can be moved to the target position for tremble correction.

Thereafter, at step S242, a predetermined target position to which the tremble correction optical member 14 is withdrawn is set independently of the target position calculated at step S240 as a position to which the tremble correction optical member 14 is moved. At step S243, signals for instructing that the correction driving actuator (X) 13X and correction driving actuator (Y) 13Y should be driven are produced based on the predetermined target position for withdrawal set at step S243. The tremble correction optical member 14 is driven to withdraw to the target position, and control is returned to step S219.

If it is judged at step S239 that the tremble correction optical member 14 is located in the space in which it will obstruct the movement of the quick return mirror 22, the information that withdrawing the tremble correction optical member 14 is completed is communicated to the camera control microcomputer 21 at step S244. Once the information that withdrawing the tremble correction optical member 14 is completed is communicated, the communication need not be performed again.

Thereafter, at step S245, a target position for correction to which the tremble correction optical member 14 is moved for tremble correction is calculated based on the result of integration performed at step S237, the current position of the tremble correction optical member 14 detected at step 3238, and the focal length stored at step S218. A current focal length is checked at step S246. This is because, as described in relation to step S144 in FIG. 12, the permissible space or correction enabling space within which the tremble correction optical member 14 can be moved for the purpose of correction of a hand tremble is limited. If a judged focal length is large, the tremble correction optical member 14 may traverse the correction enabling space. Although correction can be carried out, if the tremble correction optical member lies on the border of the correction enabling space, correction may not be able to be achieved accurately. This is true especially when a shutter speed is low. Moreover, if a focal length is small, there is no problem in terms of the correction enabling space. However, if a magnitude of drive by which the tremble correction optical member 14 is driven to move for the purpose of correction is too large, a portion of an image unaffected by a hand tremble that should be corrected may deteriorate terribly. Therefore, according to the present invention, in the aforesaid case, the correction enabling space is limited.

It is judged at step S247 whether a current focal length falls within a predetermined range. If so, step S243 and subsequent steps are carried out. If the current focal length falls outside the predetermined range, it is judged at step S248 whether the target position for correction calculated at step S245 exists within the predetermined space. If the target position exists within the predetermined space, step S243 and subsequent steps are carried out. If the target position exists outside the predetermined space, the target position for correction calculated at step S245 is changed at step S249. The target position for correction is changed to such an extent that tremble correction can be achieved on a stable basis and an image will not be deteriorated. Thereafter, step S243 and subsequent steps are carried out.

Thereafter, if it is judged at step S216 that the instruction that tremble correction should be started has been issued, step S250 and subsequent steps are carried out. As described in FIG. 21, processing is performed in order to cope with the instruction that tremble correction should be started or the instruction that tremble correction should be continued.

At step S250, it is judged whether the tremble correction optical member 14 is locked by the correction optical member lock member 16. If the tremble correction optical member 14 has been locked, the tremble correction optical member lock member 16 is controlled at step S251 in order to unlock the tremble correction optical member 14. If the tremble correction optical member 14 is not locked, step S252 and subsequent steps are carried out.

At step S252, an output of the tremble detection sensor (X) 12X or tremble detection sensor (Y) 12Y, that is, current hand tremble information (angular speed) is integrated in order to calculate a position based on which a tremble in an image derived from a hand tremble is corrected. At step S253, the current position of the tremble correction optical member 14 is checked based on the (changes in) outputs of the correction encoder (X) 15X and correction encoder (Y) 15Y. At step S254, a target position to which the tremble correction optical member 14 is moved for the purpose of tremble correction is calculated based on the result of integration performed at step S252, the current position of the tremble correction optical member 14 detected at step S253, and the focal length stored at step S218. A current focal length is checked at step S255. The reason why the current focal length is checked is the same as the reason described in relation to step S144 in FIG. 12 or step S246 in FIG. 20.

Thereafter, it is judged at step S256 whether the current focal length falls within the predetermined range. If the current focal length falls within the predetermined range, step S259 and subsequent steps are carried out. If the current focal length falls outside the predetermined range, it is judged a step S257 whether the target position for correction calculated at step S254 exists within the predetermined space. If the target position for correction lies within the predetermined space, step S259 and subsequent steps are carried out. If the target position for correction exists outside the predetermined space, the target position for correction calculated at step S254 is changed at step S258. Herein, the target position for correction is changed to such an extent that tremble correction can be achieved on a stable basis and an image will not be deteriorated.

At step S259, a signal for instructing that the tremble correction optical member 14 should be driven is produced in order to drive the correction driving actuator (X) 13X and correction driving actuator (Y) 13Y according to the set target position for correction. Thereafter, control is returned to step S219.

Figure 22:
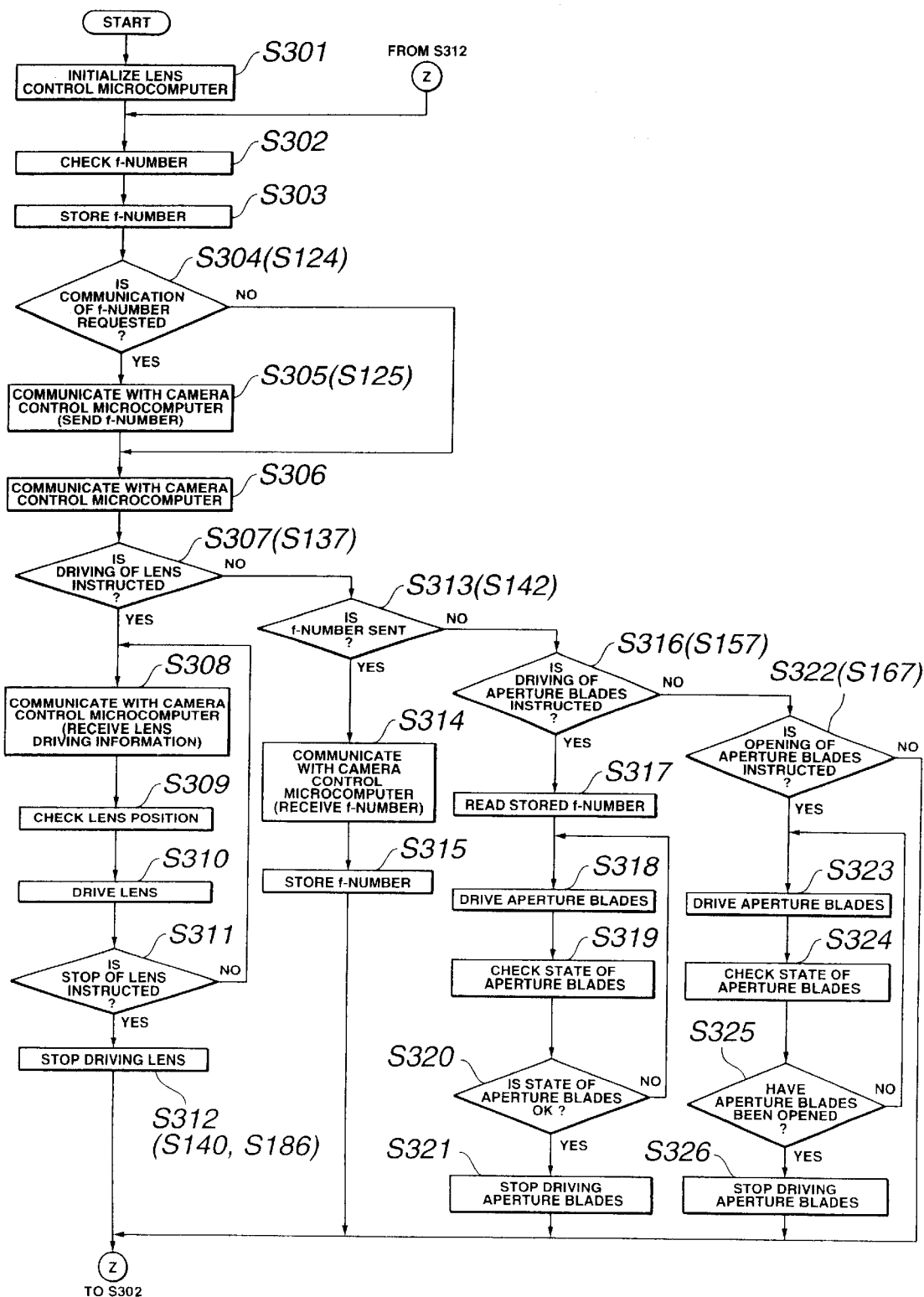
FIG. 22 is a flowchart describing control actions to be performed by a lens control microcomputer incorporated in the camera in accordance with the present invention.

Referring to FIG. 22, actions to be performed by the lens control microcomputer 41 will be described below. At step 301, the lens control microcomputer 41 is initialized. At step S302, the position of the variable power lens 48, that is, a current focal length is checked based on an output of the position-of-variable power lens detector 50. The focal length checked at step S302 is stored at step S303. At step S304, it is judged whether the camera control microcomputer 21 in the camera body 1 has requested transmission of the focal length. The requested transmission of the focal length corresponds to the communication from the camera control microcomputer 21 performed at step S124 in FIG. 11. If it is judged at step S304 that the transmission of the focal length is not requested, step S306 and subsequent steps are carried out. If it is judged that the transmission is requested, the focal length is transmitted from the lens control microcomputer 41 to the camera control microcomputer 21 at step S305. This transmission corresponds to the one performed at step S125 in FIG. 11. When the transmission of the focal length started at step S305 is completed, the lens control microcomputer 41 communicates with the camera control microcomputer 21 at step S306 so as to receive the next instruction.

Thereafter, it is judged at step S307 whether the contents of communication with the camera control microcomputer 21 are instructions to start driving the focusing lens 42 that is used to focus the camera. If the contents of communication are instructions to start driving the focusing lens 42, step S308 and subsequent steps are carried out. If the contents of communication are not instructions to start driving the focusing lens 42, step S313 and subsequent steps are carried out. The communication corresponds to the one performed at step S137 in FIG. 12.

At step S308, the lens control microcomputer communicates with the camera control microcomputer 21 to receive information concerning a driving direction and a magnitude of drive in and by which the focusing lens 42 is driven to move. Herein, the camera control microcomputer 21 calculates the driving direction and the magnitude of drive according to a distant to an object measured by a distance-to-object measuring unit that is not shown. At step S309, the position-of-focusing lens detector 43 checks the current position of the focusing lens 42. At step S310, the lens driving actuator 44 is driven based on the information acquired at steps S308 and S309 in order to drive the focusing lens 42.

Thereafter, it is judged at step S311 whether the instruction that driving the focusing lens 42 should be stopped is issued from the camera control microcomputer 21. When it is judged that the camera is in focus, or when the preparations-for-photography instructing member (1R) 34 is released during driving of the focusing lens 42, a driving stop instruction is issued. If the instruction that driving should be stopped is issued, driving the focusing lens 42 is stopped at step S312. This action corresponds to step S140 in FIG. 12 or step S186 in FIG. 13.

If it is judged at step S311 that the instruction that driving should be stopped is not issued, control is returned to step S308. Driving the focusing lens 42 is then stopped at step S312. Control is then returned to step S302.

If it is judged at step S307 that the contents of communication with the camera control microcomputer 21 performed at step S306 are not instructions to drive the focusing lens 42, it is judged at step S313 whether the contents of communication performed at step S306 are transmission of an f-number. This judgment corresponds to step S142 in FIG. 12. If it is judged at step S313 that the contents of communication are not transmission of an f-number, step S316 and subsequent steps are carried out. If it is judged that the contents of communication are transmission of an f-number, an f-number dependent on the aperture blades 45 and calculated based on a luminance level measured by a luminance-of-object measuring unit that is not shown and a film sensitivity level detected by a film sensitivity detector is received from the camera control microcomputer 21. Thereafter, at step S315, the f-number at which an object should be photographed and which is received from the microcomputer 21 is stored in a memory. Control is then returned to step S302.

At step S316, it is judged whether the contents of communication performed at step S306 are instructions to drive the aperture blades. The communication corresponds to the one performed at step S157 in FIG. 13. If the contents of communication are not instructions to drive the aperture blades, step S322 and subsequent steps are carried out. If the contents of communication are instructions to drive the aperture blades, the f-number stored at step S315 is read at step S317. The aperture blades driving actuator 47 is driven based on the f-number read at step S317, and the aperture blades 45 are driven in order to attain the f-number. Whether the aperture blades 45 are closed by driving the aperture blades driving actuator 47 at step S318 is detected using the position-of-aperture blades detector 46 at step S319. It is judged at step S320 whether the f-number received from the camera control microcomputer 21 at step S317 agrees with the f-number detected by the position-of-aperture blades detector 46 at step S319. If they disagree with each other, control is returned to step S318, and the aperture blades 45 are adjusted. If they agree with each other, driving the aperture blades 45 using the aperture blades driving actuator 47 is stopped at step S321. Control is then returned to step S302.

At step S322, it is judged whether the contents of communication performed at step S306 are instructions to open the aperture blades. If the contents of communication are not instructions to open the aperture blades, control is returned to step S302. If the contents of communication are instructions to open the aperture blades, step S323 and subsequent steps are carried out. The communication corresponds to the one performed at step S167 in FIG. 14.

At step S323, the aperture blades driving actuator 47 is driven in order to open the aperture blades 45. At step S324, the current state of the aperture blades 45 is detected and checked using the position-of-aperture blades detector 46. At step S325, it is judged whether the aperture blades 45 are open. If the aperture blades 45 are not open, control is returned to step S323, and the aperture blades 45 are driven to open again. If it is judged that the aperture blades are open, driving the aperture blades 45 using the aperture blades driving actuator 47 is stopped at step S326. Control is then returned to step S302.

Figure 23A:
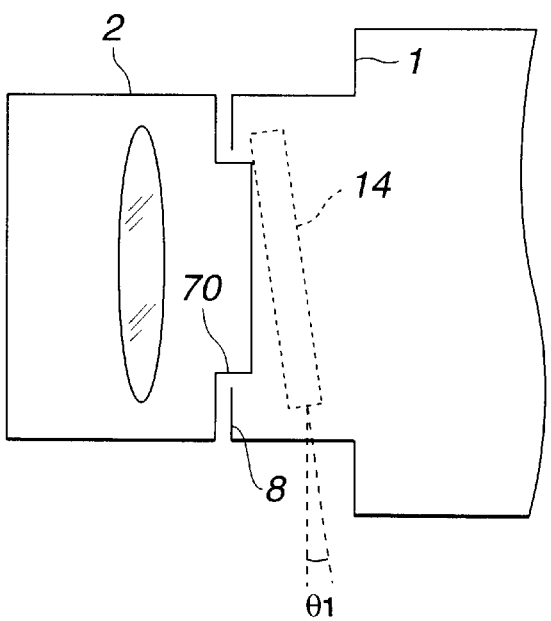
Figure 23B:
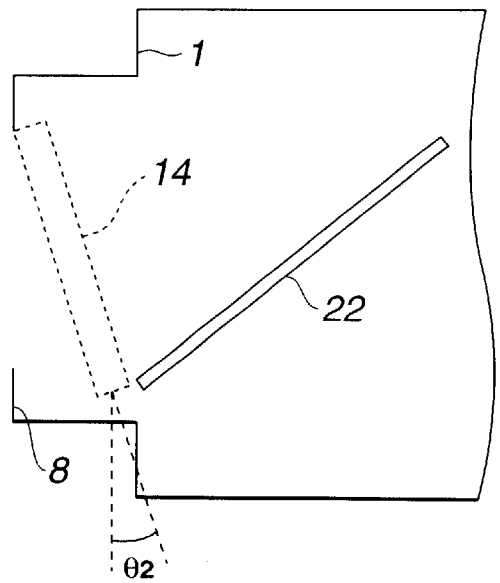

Next, the permissible space in which the tremble correction optical member 14 can move will be described in conjunction with FIG. 23. FIG. 23 shows the relationship between the tremble correction optical member 14 and an opening 70 of the taking lens 2 formed in the end surface thereof on the side of the lens mount 8 with the taking lens 2 attached to the camera body 1. The diameter 12 of the paralleled glass plates constituting the tremble correction optical member 14 must be larger than the diameter 11 of the aperture 70 of the taking lens (11<12). FIG. 23 shows the tremble correction optical member 14 that is not moved for correction, that is, locked. FIG. 23A shows the tremble correction optical member 14 that has been moved for correction to the greatest degree with the taking lens 2 attached to the camera body 1. The paralleled glass plates constituting the tremble correction optical member 14 are inclined to almost touch the aperture 70 of the taking lens. Specifically, when the taking lens is attached to the camera body, the tremble correction optical member is inclined to such an extent that the tremble correction optical member does not touch the aperture 70 of the taking lens. At this time, the maximum angle θ1 by which the tremble correction optical member can be driven is communicated from the lens control microcomputer 41 at step S126 in FIG. 11. The maximum angle θ1 is used to judge at step S239 in FIG. 20 whether the paralleled glass plates constituting the tremble correction optical member 14 are located in the predetermined space. FIG. 23B shows the paralleled glass plates, which constitute the tremble correction optical member 14, inclined to the greatest degree with the taking lens 2 not attached to the camera body 1. At this time, a maximum angle θ2 by which the tremble correction optical member can be inclined is, needless to say, set to a value that prevents the tremble correction optical member from colliding with the quick return mirror 22 and from extending beyond the lens mount 8. The θ2 value is stored in a nonvolatile memory, which is not shown, included in the camera control microcomputer 21 shown in FIG. 5, and may be used to make a judgment at step S239 in FIG. 20.

Moreover, if the paralleled glass plates constituting the tremble correction optical member 14 are inclined by a maximum angle, aberration may occur and optical performance may deteriorate. Nevertheless, the maximum angle may be used to make a judgment at step S329.

Moreover, when the lens mount 8 is capped, the paralleled glass plates that are optical members constituting the tremble correction optical member 14 must be inclined to such an extent that the paralleled glass plates do not touch the cap.

Figure 24:
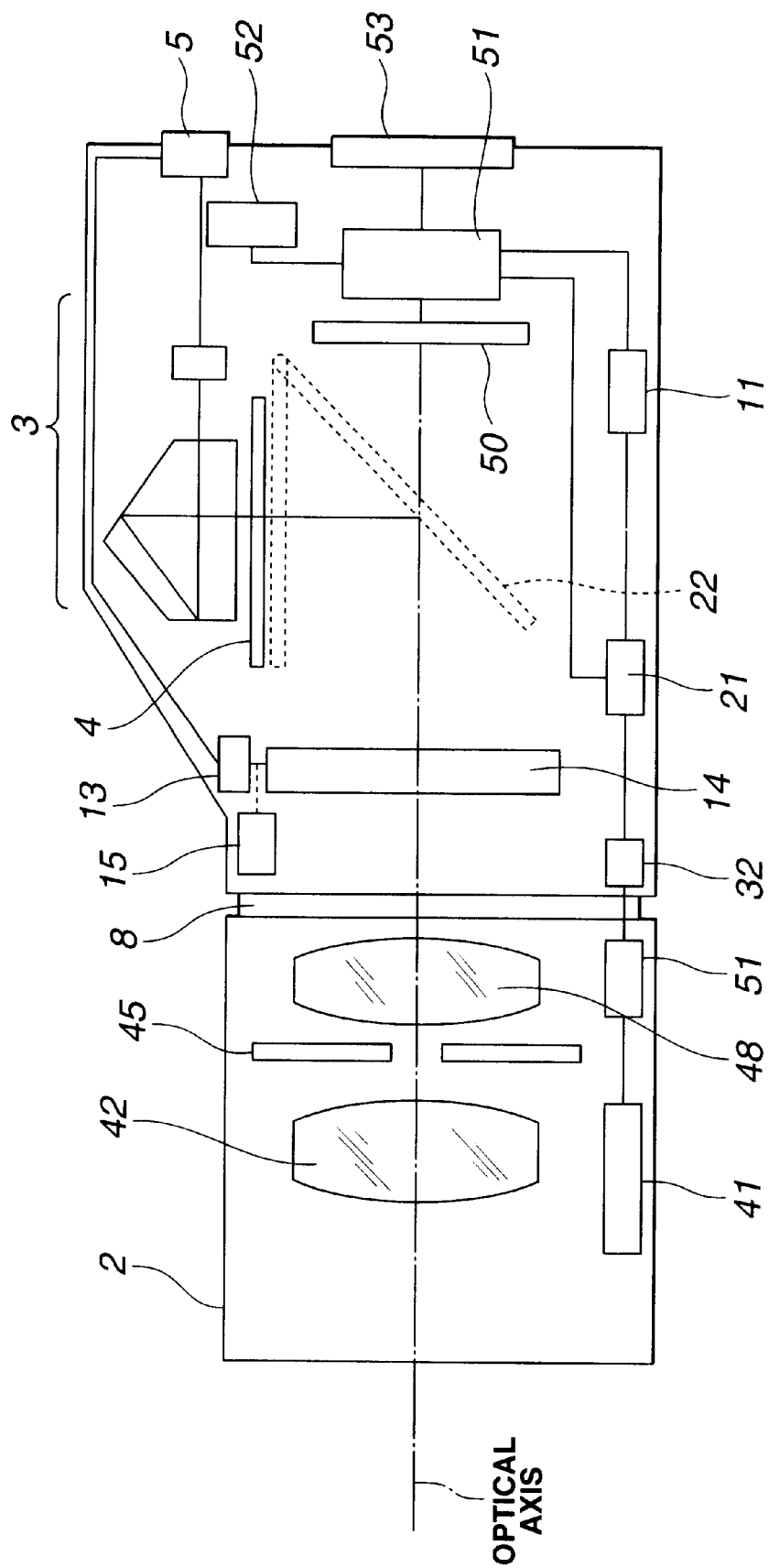
FIG. 24 is a side view showing the internal components of a body of a digital camera in accordance with the present invention, and a taking lens thereof.

Furthermore, the present invention can be adapted not only to a silver salt film camera but also a digital camera. FIG. 24 is a side view showing the overall configuration of a digital camera to which the present invention is adapted. As shown in FIG. 24, when an imaging device 50 is used to produce a digital image, the quick return mirror 22 is driven to pivot upwards responsively to a press of the start-of-photography instructing member (2R) 35. An object image is then converged on the imaging device 50. Image data produced by the imaging device 50 is subjected to predetermined image processing by an image processing unit 51, and then stored in a memory 52. Moreover, an electronic image is displayed on a monitor 53. Even in this case, the movement of the tremble correction optical member is identical to the aforesaid one. Moreover, the same reference numerals are assigned to components in FIG. 24 identical to those shown in FIG. 6, and the description of the components is omitted.

Having described the preferred embodiments of the invention referring to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A tremble correction camera comprising:
   a camera body having a main mirror and a mount in or from which a taking lens can be mounted or dismounted;
   a tremble correction optical system interposed between the main mirror and the mount, composed of optical members, and moved in order to correct a tremble;
   a driver for driving the tremble correction optical system;
   a first control unit incorporated in the camera body and controlling photography;
   a second control unit incorporated in the camera body and controlling the driver;
   a first detector for detecting whether the taking lens is attached to the camera body; and
   a second detector for detecting whether a tremble correction mode in which the tremble correction optical system is used to correct a tremble is set
   wherein when the first detector detects that the taking lens has been attached and the second detector detects that the tremble correction mode has been set, the first control unit requests the second control unit to communicate whether the tremble correction optical system is moved within a predetermined space.

2. A tremble correction camera according to claim 1, wherein when the fact that the tremble correction optical system is moved within the predetermined space is communicated from the second control unit to the first control unit, the first control unit performs control so that the main mirror will pivot upwards or downwards.

3. A tremble correction camera according to claim 2, wherein after the first control unit performs control so that the main mirror will pivot upwards, the first control unit communicates with the second control unit so as to start moving the tremble correction by the tremble correction optical system using the driver for the purpose of tremble correction.

4. A tremble correction camera according to claim 2, wherein after the first control unit performs control so that the main mirror will pivot downwards, the first control unit communicates with the second control unit so as to stop performing the tremble correction by the tremble optical system using the driver for the purpose of tremble correction.

5. A tremble correction camera comprising:
   a detector for detecting a tremble of the camera;
   a correction optical system interposed between a mount, in or from which a taking lens can be mounted or dismounted, and a main mirror, and moved in order to correct a tremble according to the tremble detected by the detector;
   a judging unit for judging whether a focal length exhibited by the taking lens falls within a predetermined range; and
   a corrective movement restricting unit for restricting the corrective movement of the tremble correction optical system according to the result of judgment made by the judging unit.

6. A tremble correction camera according to claim 5, wherein when the judging unit judges that the focal length falls outside the predetermined range, the corrective movement restricting unit restricts the corrective movement of the tremble correction optical system.

7. A tremble correction camera according to claim 5, wherein when the judging unit judges that the focal length falls within the predetermined range, the corrective movement restricting unit does not restrict the corrective movement of the tremble correction optical system.

8. A tremble correction camera according to claim 5, further comprising a warning unit that when the judging unit judges that the focal length falls outside the predetermined range, gives a warning indicating that tremble correction cannot be carried out.

9. A tremble correction camera comprising:
   a detector for detecting a tremble of the camera;
   a correction optical system interposed between a mount, in or from which a taking lens can be mounted or dismounted, and a main mirror, and moved in order to correct a tremble according to the tremble detected by the detector; and
   a corrective movement restricting unit for restricting the corrective movement of the tremble correction optical system according to a focal length exhibited by the taking lens.

10. A tremble correction camera comprising:
    a camera body having a main mirror and a mount in or from which a taking lens can be mounted or dismounted;
    a tremble correction optical system interposed between the main mirror and the mount, composed of optical members, and moved in order to correct a tremble;
    a driver for driving the tremble correction optical system;
    a first controller including a first judging unit that judges whether a focal length exhibited by the taking lens falls within a predetermined range, and controlling photography; and
    a second controller including a second judging unit that judges whether a focal length exhibited by the taking lens falls within a predetermined range, and controlling tremble correction.

11. A tremble correction camera according to claim 10, further comprising a warning unit that when the first judging unit judges that a focal length exhibited by the taking lens falls outside the predetermined range, gives a warning.

12. A tremble correction camera according to claim 10, wherein when the second judging unit judges that the focal length falls outside the predetermined range, the second control unit restricts the tremble corrective movement of the tremble correction optical system.

13. A tremble correction camera comprising:
    a detector for detecting a tremble of the camera;
    a tremble correction optical system interposed between a mount, in or from which a taking lens can be mounted or dismounted, and a main mirror, and moved in order to correct a tremble according to the tremble detected by the detector;
    a lens change switch to be used to dismount the taking lens from the mount;
    a detector for detecting whether the taking lens is mounted in the mount; and
    a movement control unit for controlling the movement of the tremble correction optical system according to a change in the state of either the lens mounting detector or the lens change switch.

14. A tremble correction camera according to claim 13, further comprising a setting unit that sets as a photography mode a tremble correction mode in which the tremble correction optical system is used to correct a tremble, wherein when the setting unit sets the tremble correction mode and the lens change switch is manipulated, the movement control unit restricts the movement of the tremble correction optical system.

15. A tremble correction camera according to claim 14, wherein the movement control unit restricts the movement of the tremble correction optical system by centering and locking the tremble correction optical system.

16. A tremble correction camera according to claim 15, wherein after the movement control unit controls the movement of the tremble correction optical system, the tremble correction mode set by the setting unit is canceled.

17. A tremble correction camera according to claim 13, further comprising a setting unit that sets as a photography mode a tremble correction mode in which the tremble correction optical system is used to correct a tremble, wherein when the setting unit sets the tremble correction mode and the detector detects that the taking lens has been mounted on the mount, the movement control unit restricts the movement of the tremble correction optical system.

18. A tremble correction camera according to claim 17, wherein the movement control unit restricts the movement of the tremble correction optical system by centering and locking the tremble correction optical system.

* * * * *